US008713054B2

(12) United States Patent
Turner et al.

(10) Patent No.: US 8,713,054 B2
(45) Date of Patent: Apr. 29, 2014

(54) SYSTEM OR METHOD TO ASSIST AND AUTOMATE AN INFORMATION SECURITY CLASSIFICATION AND MARKING PROCESS FOR GOVERNMENT AND NON-GOVERNMENT ORGANIZATIONS FOR INFORMATION OF AN ELECTRONIC DOCUMENT

(76) Inventors: James Luke Turner, Raleigh, NC (US); Robert Edward Turner, Huntingtown, MD (US)

( * ) Notice: Subject to any disclaimer, the term of this patent is extended or adjusted under 35 U.S.C. 154(b) by 0 days.

(21) Appl. No.: 13/153,761

(22) Filed: Jun. 6, 2011

(65) Prior Publication Data
US 2011/0314551 A1   Dec. 22, 2011

Related U.S. Application Data

(63) Continuation of application No. 11/520,857, filed on Sep. 13, 2006, now Pat. No. 7,958,147.

(60) Provisional application No. 60/716,407, filed on Sep. 13, 2005.

(51) Int. Cl.
*G06F 17/30* (2006.01)
(52) U.S. Cl.
CPC .............................. *G06F 17/30867* (2013.01)
USPC .......................................... 707/784; 707/694
(58) Field of Classification Search
CPC .................................................. G06F 17/30867
USPC ......... 707/669, 770, 802, 803, 804, 783, 784, 707/694; 709/203, 223; 726/27
See application file for complete search history.

(56) References Cited

U.S. PATENT DOCUMENTS

| 2006/0031442 A1* | 2/2006 | Ashley et al. ................. 709/223 |
| 2008/0094654 A1* | 4/2008 | Troyansky et al. .......... 358/1.14 |
| 2008/0215897 A1* | 9/2008 | Doyle et al. .................. 713/193 |
| 2009/0178144 A1* | 7/2009 | Redlich et al. ................. 726/27 |

* cited by examiner

*Primary Examiner* — Shahid Alam

(57) ABSTRACT

A software engine runs in a compatible mode with off-the-shelf word processors, e-mail programs and presentation development software and other document development software. The software engine is used for the security classification of sensitive or national security classified information in electronic and resultant hard copy document formats. The software engine ensures that the individual considers all informational portions of a document, that appropriate document marks are employed, that document marks in their electronic format are persistent and that all necessary information, such as classification guides, standards and security regulations, provided by the organization to classify information is at hand and immediately available. In addition to the document sensitivity or classification determination and marking support, the software engine tracks and controls documents and the electronic media storing documents. It also provides warnings and alarms, ad hoc document security analysis and reporting capability to system security administrators with respect to document or network events or captured information that may be indicative of risk to the information requiring protection. The software also provides the ability for an organization to centrally establish and control a security classification or sensitivity marking hierarchy for automated security classification support.

106 Claims, 24 Drawing Sheets

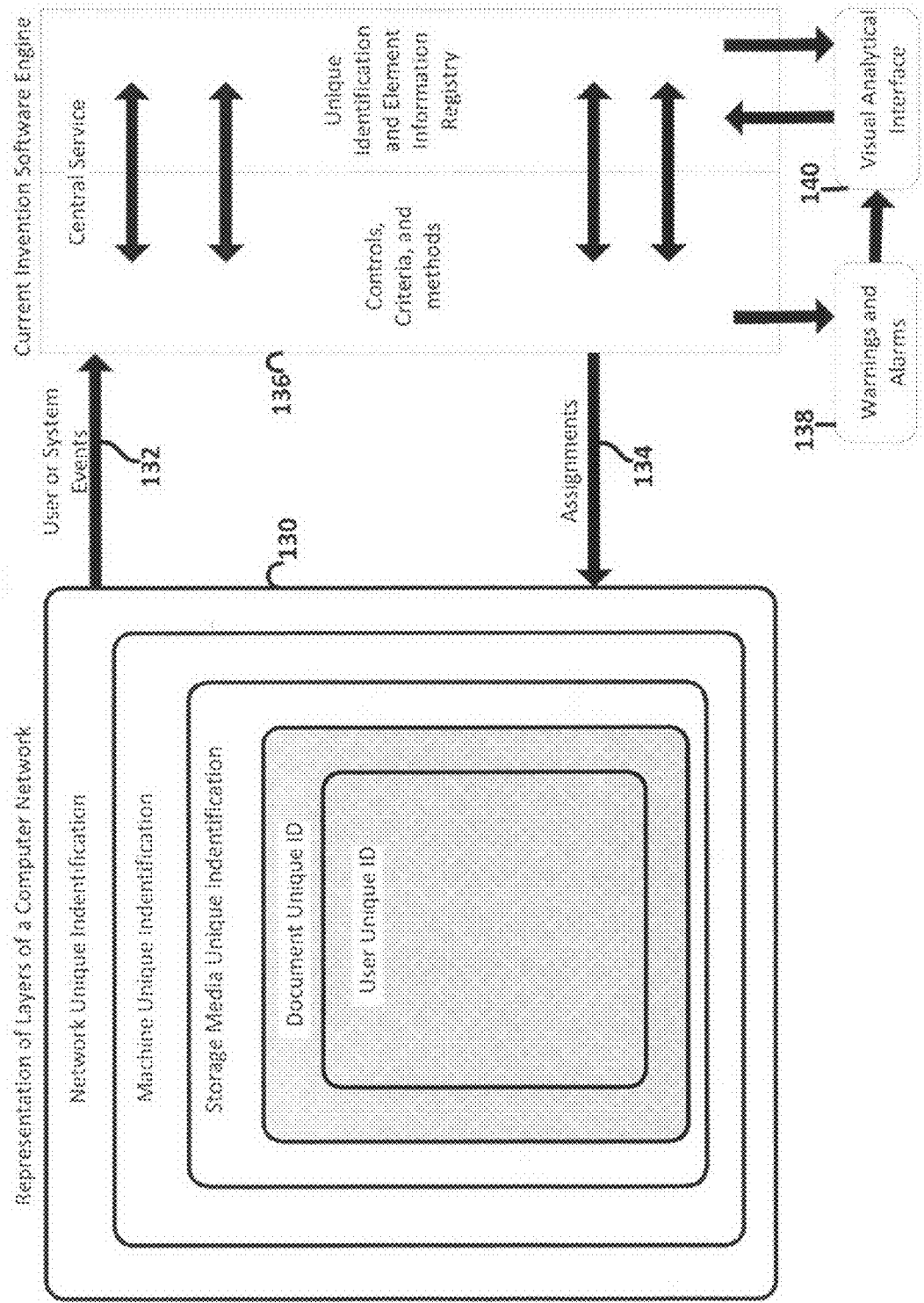

SYSTEM OR METHOD TO ASSIST AND AUTOMATE AN INFORMATION SECURITY CLASSIFICATION AND MARKING PROCESS FOR GOVERNMENT AND NON-GOVERNMENT ORGANIZATIONS FOR INFORMATION OF AN ELECTRONIC DOCUMENT

This application is a continuation of U.S. Ser. No. 11/520,857, filed Sep. 13, 2006, now U.S. Pat. No. 7,958,147 which claims the benefit of U.S. Provisional Application No. 60/716,407, filed Sep. 13, 2005, which are hereby incorporated by reference in their entireties.

TECHNICAL FIELD OF THE INVENTION

The present invention relates to customized and automated security assistance, central tracking and control, and document marking regimes for protecting sensitive or national security classified information existing or developed on a computer system, computer network or series of computer networks, as well as protection through identification of the same information in resultant hard copy format.

BACKGROUND OF THE INVENTION

The creation of computer systems, networks of computers, and associated software that allow automated assistance in document development has by its very nature reduced the rigor of document security as it was applied in previous paper document/information control systems. Computer systems, document development software, and the capability to store huge numbers of documents on portable media devices encourages the proliferation of, and access to, sensitive or classified documents as well as the proliferation and the storage of outdated or otherwise unnecessary drafts and versions of sensitive and classified documents on computer networks thereby increasing security risks to the protection of the information contained in electronic documents.

Other basic flaws exist in document marking and classification systems as applied to computer automated information systems that process classified and/or sensitive information. Generally, no positive marking or other positive identification exists for documents that do not contain sensitive or classified information and require no markings. The potential and often inadvertent consequences of the lack of positive feedback to users of document development software are assumptions by system users that the information in unmarked documents has been considered via a document sensitivity/classification determination process when in fact it may not have been through any such process. Electronic documents on sensitive or classified computer systems, and their corresponding printed versions, that do not display classification marks in the body of the document may in fact contain classified or sensitive information and exist without marks due to user error, or as draft documents prematurely saved or disseminated. Such errors and assumptions may lead to system users mishandling or compromising unmarked sensitive or classified information by mistakenly moving the information off of the protected network or providing access to the information contained in the document to individuals not authorized to access the information. Under current systems a user receiving or accessing an electronic document that is not marked is unable to make a positive determination that the documents sensitivity/classification has been considered and thus that the requirement for no visible sensitivity or classification marks in the body of the document has been properly determined by the originator of the document. The recipients document may well be in draft mode or just a mistake, but without a positive and persistent indicator of the status of the document's sensitivity/classification the recipient may mishandle or compromise the information.

Recent advances in information/document development software, computer networks that allow for broad and rapid dissemination of documents as well as removable electronic storage media capable of accumulating hundreds of thousands of documents magnifies the security risk of missmarked or improperly controlled sensitive or classified information. The current state of developing, processing and disseminating sensitive and/or classified information for stand-alone computers as well as networked computers is piecemeal, relying on disparate, paper based operating and format instructions, manual marking and poorly informed originating assessments that subject documents to marking errors, poor document control, as well as possible invalid assumptions when documents contain no sensitivity/classification marks.

Computer document development software makes it easy for users of systems to remove, or otherwise alter, manually applied sensitivity or classification marks from a document. The potential to remove or alter document marks without detection and print or copy the documents creates additional vulnerabilities to the information contained therein and contributes to the threat posed by authorized users of a computer network (insider threat).

Compounding these systemic flaws, there currently is little positive control and tracking over the access to and the movement of such information on computer networks. As a result, Government and businesses are grappling with intentional insider threats to sensitive and classified information on their systems, as well as inadvertent disclosures from their systems that compromise protected critical information.

In order for electronic document security to be effective the identification and marking of sensitive and classified information contained in documents on computer systems and networks must be an individual assessment process by the originator of the information/document; an assessment process that is closely guided by immediately available classification and format criteria of the organization with centralized control and tracking of the documents by the organization. The document marks must be immediate and persistent with mechanisms to identify changes and or removal of the classification marks, it and must provide for a positive determination that documents that are not required to display a sensitivity/classification mark have completed the organization's classification process. Additionally, effective electronic document security will provide methods to identify and resolve anomalies involving document marking, electronic storage, movement, access and dissemination of documents.

Any software firm that produces word processing, e-mail, presentation or other document development systems needs to make their product line more effective in sensitive and classified information environments.

Needs exist for new methods of classifying controlling and protecting electronic documents.

SUMMARY OF THE INVENTION

The present invention ensures that electronic documents are marked or otherwise identified as to their sensitivity from their origination. The present invention assures the ability of a network user to make a positive determination when a document is not required to present sensitivity/classification marks in the body of the document that the document's originator has processed the document's information through the organization's classification process and that the document does not contain sensitive or classified information. The present invention provides a method of centralized tracking and control of sensitive or classified documents as well as the electronic media on which such documents are stored. The present invention provides a mechanism to identify and resolve anomalies in document marks, user access to documents, electronic storage, movement, or disemination of documents; anomalies that may be indicative of security risks to the information therein.

The present invention puts some of the security rigor that existed in previous paper based classification and marking systems into electronic systems and provides for the necessary control and tracking of sensitive and/or classified documents in and across computer networks by providing:

1. Centralized control that provides a consistent and persistent document marking format, classification scheme, marking hierarchy, and classification guidance across a computer system, computer network or series of networks.

2. A desktop tool for system users that assures that document originators consider all information within a document, that provides the originator with immediate access to the pre-determined classification guidance and other security considerations of the organization, and provides a mechanism to ensure that a document is marked to the established rules and format of the organization and that the sensitivity/classification mark is persistently associated with, and imbedded into the document.

3. Assurance in the sensitivity or classification determination process that the process is flexible enough to allow for levels of document review and changes during the documents origination process. Flexibility that allows for, and ensures persistent interim document sensitivity or classification marks and ensures that any changes made to the document during a review process are addressed during the final sensitivity or classification determination.

4. A method of positive control across a network or system of networks for each instance of the desktop tool interface with the user. Control that ensures that the sensitivity or classification determination dialogue, and related classification guidance that is available to the user, meets the level of the user's classification authority, as well as his or her information access authority on the computer network.

5. A process and mechanism to assess, track and if necessary alert security personnel on the sensitivity/classification of information during "Cut and Paste" operations within a document or between documents.

6. A mechanism for system users to have immediate and positive feedback that an electronic document, that does not display sensitivity or classification marks in the body of the document because it is either not required or inappropriate, has been through the organization's sensitivity and classification process and is not required to be marked. The mechanism provides consistent document user feedback assurance that is persistent across a computer network or system of networks. This document/information classification process assurance translates to hard copy documents printed from the computer network employing the invention.

7. A centralized system of warnings and alerts to security personnel responsible for the protection of sensitive or classified information contained in electronic documents that identifies unusual patterns of user document access, unusual alteration or removal of document classification marks, unusual movement or storage of documents within or across computer networks as well as other potential anomalies that may be indicative of insider threats or other risks to the information contained therein.

8. A mechanism and process consisting of unique codes representing document classification marks and corresponding classification criteria that are hidden and imbedded into an electronic document, that correspond to, but are separate from, the visible classification marks that may exist in the body of an electronic document. Imbedded classification codes identify the classification and organizational ownership of information contained in an electronic document, even when the visible document classification marks have been removed from the document outside of the software invention, or the document has been removed from the network monitored by the software invention. Such imbedded code mechanism and process supports Internet packet watch software and content monitoring software that allows for the identification of sensitive and/or classified documents removed or otherwise disseminated electronically from their approved or national security classified systems to non-approved systems without compromising on open systems potentially sensitive or classified rationale or criteria for the document's designation.

9. A centralized mechanism and process that leverages the unique imbedded coding identified in item 8 to identify and asses the content sensitivity of documents residing on electronic storage media such as hard drives, diskettes, thumbdrives, etc. A mechanism that also provides a method for establishing remotely the highest level of sensitive or classified information on the storage media and thus the overall physical protection requirements for the media. The mechanism and process has a unique capability to monitor document network storage media and identifies access to or manipulation of documents even when the media is not connected to a network monitored by the software invention, upon reconnection of the media to the monitored network.

10. A process to record and track the derivation of a document originating from other documents and it's associated sensitivity or classification.

11. A method to control printing copies of invalidly classified or marked documents and to track the number of printed copies as well as electronic copies of individual documents.

12. A process and mechanism for system security administrators to identify and remove unnecessary drafts, copies or versions of sensitive and or classified documents resident on a computer, network of computers or system of networks.

13. A process and mechanism to control and record the electronic distribution, movement and access to sensitive or classified documents on a computer network or system of networks.

14. A process and mechanism to associate the sensitivity/classification of the information contained in a document to the electronic document, the document with the individual making the classification determination and other users of the document, the document to the individual computer on the network where the document was originated, as well as the computer with the storage medial and location of the storage media on the network and the association of all of the above to a specific network. Such matrixed relationships allow for unique oversight of document network activity and is driven by the initial ability to consistently, reliably and electronically capture the sensitivity/classification of an electronic document on the network.

The present invention is a software engine and supporting software components that run in a compatible mode with "off-the-shelf" word processors, e-mail, presentation and other document development software on a computer network or system of computer networks. For the purposes of this invention an electronic document is defined as any information in electronic or computer format. The software engine is used for the security classification, marking and control of sensitive or national security classified information in electronic and resultant hard copy document formats. The software engine ensures that the individual considers all informational elements of a document, that appropriate document marks are employed, that document marks in their electronic format are persistent and that all necessary information, such as classification guides, standards and security regulations, provided by the organization to classify information is at hand and immediately available during the sensitivity or classification determination process. The present invention provides the ability to record, register and monitor essential information for system electronic documents, users, storage media, machines and network information in a relational matrix for security analysis and alarm and warning criteria, with centralized control, and tracking capability for documents and associated electronic document storage media.

These and further and other objects and features of the invention are apparent in the disclosure, which includes the above and ongoing written specification, with the drawings.

BRIEF DESCRIPTION OF THE DRAWINGS

FIG. 23 shows a process flowchart for invention system central service, information registration and network monitoring.

DETAILED DESCRIPTION OF THE PREFERRED EMBODIMENTS

Figure 1:
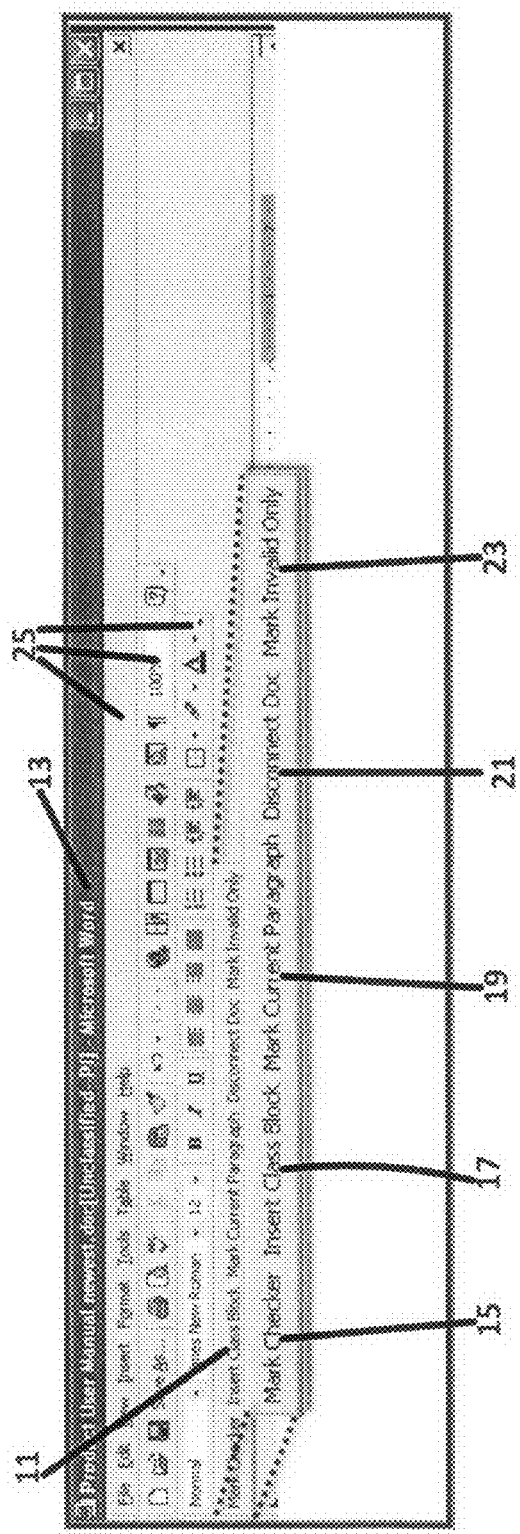
FIG. 1 shows a possible location of the tool bar in a Microsoft Word application.

The present invention allows an organization to develop, establish and implement an automated assistance system to identify, mark, control, track and otherwise protect the sensitive and/or classified information of the organization when that information is in an electronic or resultant hard copy format.

The present invention is a software engine and process that runs in a compatible mode with "off-the-shelf" word processing, e-mail, presentation or other document development software. The software engine is used for the security classification, marking and tracking of sensitive or national security classified information in electronic and resultant hard copy document formats. The software engine ensures that the document originator considers all informational portions of a document, that appropriate document marks are employed, that document marks meet predetermined criteria established by the organization, that the document marks in their electronic format, as well as resultant printed formats, are persistent and that all necessary information, such as classification guides, standards and security regulations, provided by the organization to classify information is at hand and immediately available for the originator's consideration.

The present invention is a software system for enabling an organization to quickly implement national security information protection requirements or to develop and easily implement a unique information protection scheme for the organization's sensitive or proprietary information in electronic document and resultant hard copy formats for a stand-alone computer, a computer network, or a system of computer networks. The development of such protection systems consists of established criteria, written guidance, and document marking schemes in accordance with a predetermined set of rules, and a computer desktop interface for authorized users and classifiers of the information.

The present invention may also be used for the identification of and declassification of electronic documents registered with or developed via the invention that meet predetermined declassification criteria.

The present invention also includes a methodology to assist the government or other organization security personnel to identify and resolve user anomalies regarding documents that contain sensitive or national security classified information with respect to network user access to such documents, manipulation of document marks or the movement of documents within, or off of, approved computer systems and electronic storage media containing sensitive or national security classified information.

The present invention is a methodology and process to ensure that national or organizationally specific classification guidance and other security information necessary to make an informed classification judgment is immediately available to the document originator or classifier; that classification and marking of sensitive or national security classified information is applied consistently and meets organizational format and marking criteria across a computer network or system of computer networks. The invention associates the specific classification criteria, and the date thereof, used to classify a document with the developed document. This ensures that any system documents that may have been developed under outdated criteria can be easily identified and located electronically for any necessary adjustment. The present invention is also a centralized methodology and process to automatically disseminate updated classification criteria and guidance information across a network or system of networks.

The present invention is a methodology and process that provides positive feedback to the recipients or users of electronic documents as to the status of the classification and marking process. In addition, the methodology and process provides assurance to recipients and users of electronic documents that final classification marks established by means of the current invention's assisted classification and marking process in either electronic or resultant paper format meet the organizations criteria and format. The methodology and process provides positive visual assurance to recipients and users of unclassified or other electronic documents that do not require document sensitivity/classification marks that the information contained therein has been appropriately assessed for sensitive or classified content and not overlooked.

The present invention is also a methodology, process and software program that leverages the inherent hidden coding capability of electronic documents developed by means of electronic document development software to embed and hide information within the document's electronic shell. The invention's ability to reliably and consistently capture document classification information enables the invention to imbed the document sensitivity/classification information, document history, classification criteria, network information and other pertinent information relative to the protection of the information contained in the electronic document in the document's electronic shell. The present invention's capability to convert document classification determinations into a unique set of codes representing the classification information and criteria and imbedding the codes into the document shell enable external content monitoring or Internet packet monitoring software configuration without compromising potentially sensitive or classified classification criteria on open networks. Such monitoring software configurations enable organizations to identify sensitive or classified documents outside of their approved networks, even when the visible sensitivity/classification marks have been removed from the document. Thus the current inventions process of embedding codes in multiple shell locations allows for easy identification of documents via electronic content monitoring, Internet packet monitoring and/or data matching software, identification of documents that may have been improperly removed from their approved systems via electronic storage media, e-mail, text messaging or other similar means of transfer without compromising sensitive or classified criteria used to identify and mark information contained in the document.

The present invention is a methodology and process for tracking and identifying in real-time the downgrade, upgrade, or other manipulation of a document's classification marks across a computer system, network or series of networks providing a basis for identification and resolution of illegal, improper or unauthorized activity that may jeopardize the security of the information.

The present invention is a methodology and process for enabling security personnel to assess and make judgments with respect to the movement of, or access to, sensitive and/or national security classified documents, e-mails and/or presentations on an authorized computer system, network or series of networks when in their electronic form. Such capability provides a basis to identify unusual patterns of activity, or other anomalies on an approved network and resolve potential illegal, improper or unauthorized activities by "Insiders"/authorized network users that may jeopardize the security of the information.

The present invention is also a methodology and process for allowing an agency, organization or other unit to configure document marking format and criteria to organizational needs and to centrally control and maintain classification criteria and format on a computer system or across a network or series of networks.

The present invention is a methodology and process for ensuring that document information when changed via word processor "Track Change" type of processes that such changes are considered and resolved prior to final classification of the document providing additional confidence to recipients and users of finalized electronic documents, and the resultant paper format, that all of the information contained therein has been considered during the classification process.

The present invention monitors word processing software "Cut and Paste" type operations conducted by system users on, or between documents, and ensures that the sensitivity of the information moved during such operations is assessed, monitored and logged, and if needed initiates flags or warnings to the System Security Administrator.

The present invention is also a process and methodology to identify, control, track and classify legacy documents that existed on a computer system, network or system of networks prior to the installation and use of the present software invention. The present system also serves to identify foreign documents (documents not originated by the organization or not originated on the specific network), captures document information, classification or sensitivity, and controls the document without altering the marking format imposed on the document by other organizations. The present invention's identification and control of foreign documents that may already exist on the computer, computer network or series of computer networks prior to the installation and use of the present software invention, as well as foreign documents that may be introduced to a computer, computer network or series of computer networks, by any means after the installation and use of the present software invention ensures complete document security coverage enabling additional tracking and warning criteria dependent upon document type (legacy, foreign, or originated)

The present invention is a process and methodology to provide statistical information to security personnel and organization managers on the number of sensitive or classified documents that exist on a computer system, the sensitivity levels of the information, and the categories of the information, as well as the individuals classifying the documents, individuals accessing documents, the derivation of documents, location of the document, type of document (legacy, foreign, originated), status (valid marks or invalid marks) time and date of access, etc., providing basis for identification, investigation and prosecution for mishandling and/or compromise of sensitive or classified information.

The software invention stores and tracks an array of document information, such as number of copies printed and by whom, original author, individuals who accessed a document, individuals who changed the content of a document, etc. The invention associates new documents that are derived from older documents with their base documents, tracks sensitive e-mail document attachments captures and logs the e-mail address of recipients; identifies and handles foreign and legacy documents.

The software invention provides a flexible display and an analysis and report capability for system security administrators to conduct ad hoc comparisons and analysis across all stored document information data The invention provides user flexibility for documents that are unusually complex or require unanticipated classification formats by allowing users to partially disconnect the invention software from the document development application and revert to manual classification and marking. However, all such disconnects are recorded, logged and tracked by the software invention and require a reason and a classification determination by the originator of the document or individual disconnecting the document maintaining the document security integrity of the invention.

The invention sets system-wide pre-established criteria in a hierarchal matrix, for the identification of network user behavior or document/storage media anomalies indicative of potential security risk to the information. The criteria are used by the software invention to generate automated alarms and flags and other types of notification for the system security administrator. The invention provides a visual alarm code interface with different colors designating the type of alarm and the degree of the potential concern or risk. Flags, alarm and event criteria may include but are not limited to:

1. Drive or electronic storage media ID manipulation
2. Drive or electronic storage media moving on, or missing from, the network
3. A document disconnected from the software engine longer than a preset time period
4. A document with interim or invalid document marks longer than a preset timed period
5. Any activity with disconnected or invalidly marked documents such as an attempt to print
6. Downgrade of a document's original classification level
7. Removal of a document's classification marks
8. Change of document originator
9. Attempt to e-mail an invalid or disconnected e-mail document
10. Attempt to send as an e-mail attachment an invalid or disconnected document
11. Multiple access instances to a document by a user other than the originator of the document
12. Access to numerous documents by a user not the originator of the documents
13. User movement and collection of documents not originated by the user
14. Importing foreign documents into the network
15. User copying or creating document(s) onto removable electronic media under a preset drive size in Gigabytes
16. Improper user access attempt (tried to manipulate the user INI files for false login)
17. Attempt to pass a document classification as an original classification when user does not have original classification authority
18. User attempt to log in a network outside of his or her machine realm
19. User attempts to use "Cut and Paste" activities to alter sensitivity determination of information contained in a document.

The invention software engine does not attempt to classify the information contained in the documents; it is necessary for individual(s) originating the document with the expertise and authority within an organization to make classification judgments due to the complexity of applying criteria to determine sensitive or classified information. Human reason and judgment is required to assess document information and graphics as well as assess the compilation factor of potential sensitive or classified information contained in document portions that might alter the sensitivity or classification determination. Therefore the invention provides the originator(s) of a document an automated classification environment that supports the classification process. The invention ensures (1) proper classification format and marking (classification marks are critical to the subsequent proper identification of the protection requirements of the information by future users of the document); (2) the immediate availability to the classifier of the document of all pertinent classification criteria and guidance to conduct the classification process; (3) that all portions of a document are considered, classified and appropriately marked during the classification process; (4) that portion marks and document marks are persistent and not mistyped; (5) that the classification process is complete and if not completed that the draft or work in progress document contains persistent interim system level high classification marks. Additionally the invention software engine serves as the platform to electronically gather, associate and imbed into the document's electronic shell reliable information on the documents classification and status as well as other document information relevant to tracking the document and protecting the information contained therein.

The invention provides the organization with a method to easily configure their classification criteria and to assign associated guidance. The invention provides the capability to compartmentalize the user classification interface based on the informational access "Need to Know" criteria of the user, by means of user access profiles, providing compliance with national requirements associated with automated information security Protection Levels 1 through 5. The present invention provides the user with a methodology and interface that combines all of the disparate information necessary to make effective classification judgments in one automated tool. In addition, the present invention imposes a predetermined hierarchal document mark algorithm to automate the overall document mark determination. The invention enables an organization to create, establish and impose the hierarchal document mark algorithm network-wide for each system user classification interface. The invention's assurance of appropriate classification marks on electronic documents, final or interim, extends to all resultant hard copy embodiments of the document printed or copied from the electronic format The invention enables the organization to associate classification criteria and guides electronically with individual elements of the user classification interface, as well as the ability of the organization to ensure network-wide accurate and up-to-date classification guidance to the user providing for version control of their classification guidance across a computer network or system of networks. The version control capability associates with each document classified the version and date of the classification criteria used to classify the document. User access to classification guides can be centrally set and controlled by the system security administrator to conform to user "Need to Know" profiles or other access authority.

Figure 16:
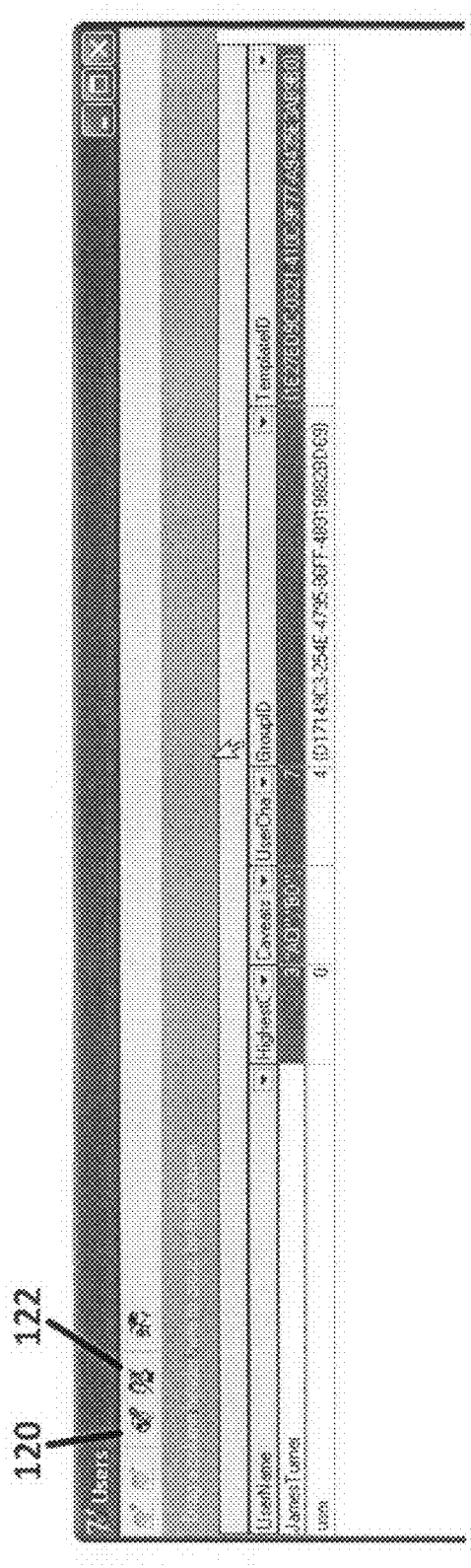
FIG. 16 shows a construct of the CM User "Need to Know" assignment interface.

FIG. 16 represents a possible security administrator interface to configure user "Need to Know". Group Button 120 and Template Button 122 provide additional functionality by applying such assignments via groups of users or templates of access.

Figure 3:
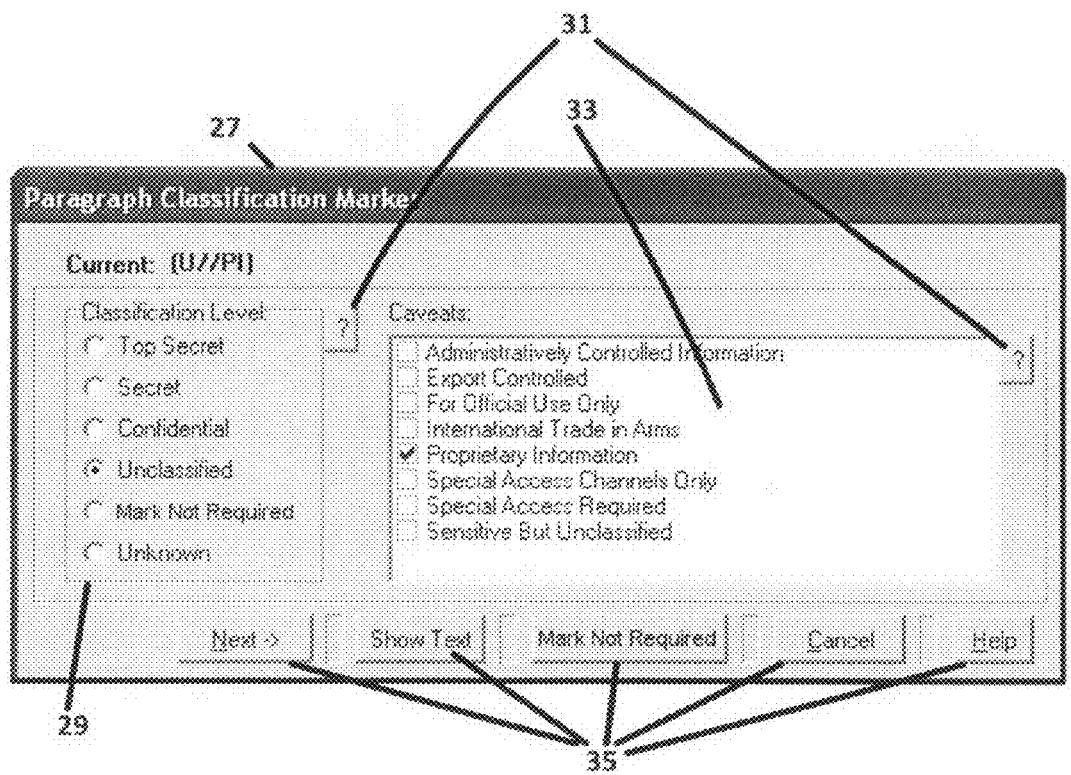
FIG. 3 shows a sample of a compact user classification tool dialogue.
Figure 17:
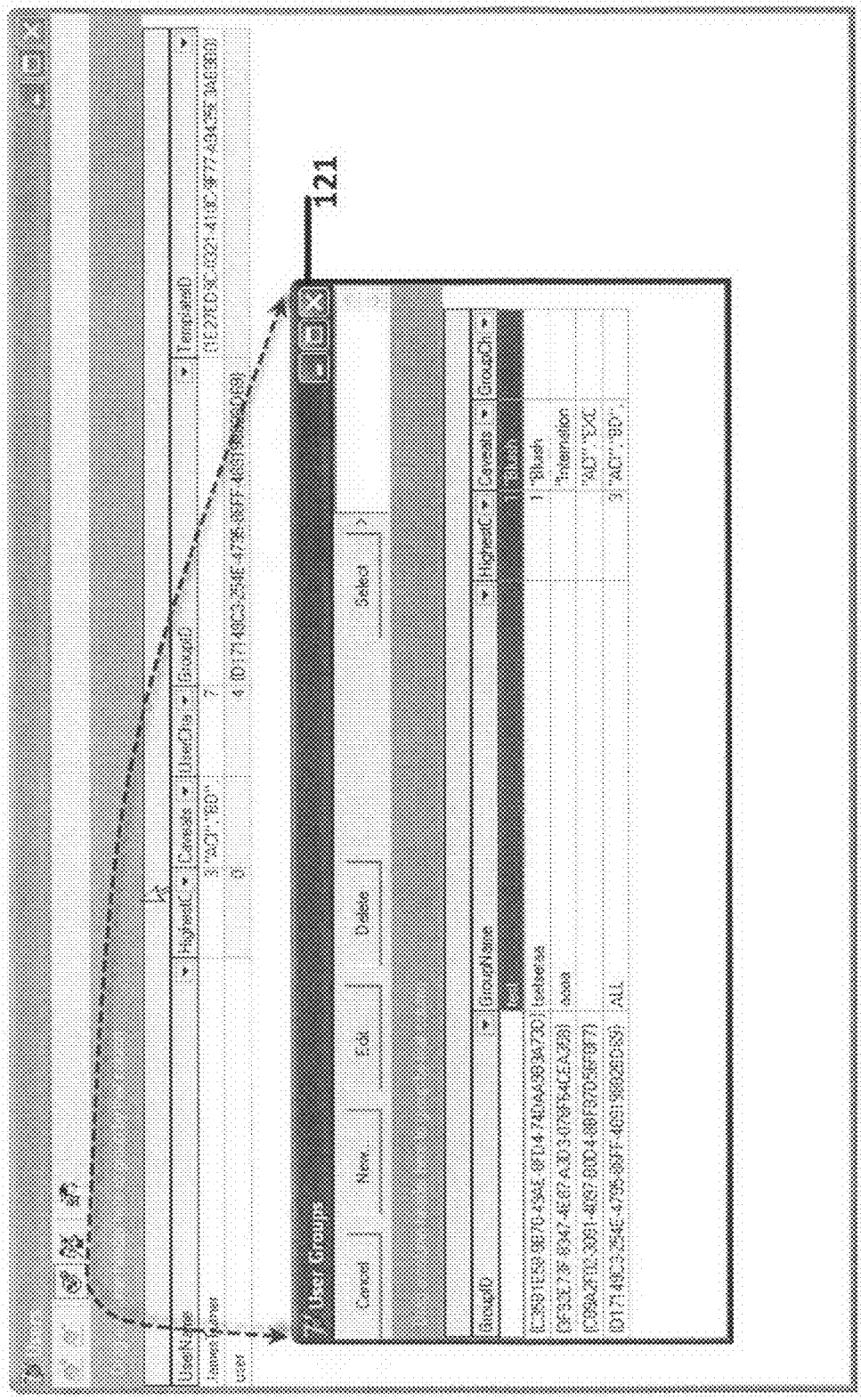
FIG. 17 is a detail of the CM Group Button interface for User assignments.

FIG. 17 provides additional detail 121 selected by clicking the Group Button 120 interface. In addition to the classification guides, specific instructional material and security educational information may be associated with each element, designation or caveat mark of the user classification dialogue and becomes instantly available to the user during the classification process via the user classification dialogue 27, as shown in FIG. 3.

The software engine is configured to assist any organization to easily develop and implement across a computer network any document classification and protection scheme. The network or program security administrator for an organization can establish the classification criteria. Its nomenclature and a hierarchal relationship via the security administrator interface. The security administration interface allows for the development of any type of electronic document security regimen. However, the balance of this invention description will use the U.S. National Security Classification process as an example. Other security classification processes are used in alternative embodiments. E-mail, word processing and presentation development software as well as other types of document development software have tool bars that assist the user to apply the present process.

FIG. 1 shows a possible location of a tool bar 11 in a Microsoft Word application 13. User selection of a button on the tool bar 11 launches an aspect of the user interface portion of the invention. Possible buttons on the tool bar 11 include Mark Checker 15, Insert Class Block 17, Mark Current Paragraph 19, Disconnect Doc 21, and Mark Invalid Only 23. The tool bar 11 may be located below the standard toolbars 25 of the base program 13. Other configurations and positions are possible. A description of the function of each tool bar button is provided. The following is an example of one embodiment of the present invention. Various alternatives and alterations are possible to configure the present invention to each organization's specification.

Mark Checker 15—This button initiates a classification dialogue tool and begins a process that sequentially highlights each element of a document that may require a classification decision and an associated paragraph/portion mark.

A common mistake of many individuals that handle classified and/or sensitive information is to identify the overall classification of a document before they begin to produce the document. This invariably leads to under and over classification of documents because the individual classifies and marks the document to his or her predetermined assessment. Such processes tend to minimize thoughtful assessment of the sensitivity of the information contained in each paragraph/portion of the document.

The classification dialogue tool 27, FIG. 3 of the present invention provides an organizationally predetermined menu of choices to classify and mark the sensitivity of the information in each paragraph and requires the user to consider each paragraph or portion of the document in order to effect a final classification determination, thereby minimizing predetermined classification assessments. The elements of each such user classification interface dialogue, including associated classification guidance, may be preset by the System Security Administrator to conform to a users classification authority or "Need to Know" for each system user.

High-level classification selections 29 presented to the user via the classification dialogue 27 shown in FIG. 3 may range from Top Secret to Unclassified depending upon the system's level of authorization to process classified information, as well as the user's level of authorization profile ("Need to Know") to access classified information. Each high-level classification is linked to classification sub-elements, program caveats or handling instructions that an organization prefers or requires in their format. The display to the user of the related sub-elements, program caveats or handling instructions is also dependant upon the user's "Need to Know". The present invention allows the user to select only one of the high-level elements; they are mutually exclusive. However, the user may select multiple caveats 33 or handling instructions 33 from the list associated with the high-level element 29 selected. The interface only presents to the user sub selections or caveats associated with their prime selection that meets their "Need to Know" profile. The user merely makes the sensitivity judgment for each unit of information in the document referring, if necessary, to the classification guidance that may be associated with his or her classification selection by means of a mere click on button 31.

The invention process allows the user to by-pass paragraphs or portions of a document without making a classification determination; however the software will prevent a final determination mark for the document until all paragraphs or portions have been considered and marked. Documents not finalized via the invention software carry an interim mark established by the software that identifies it as "Not Properly Marked" and appends a predetermined mark that sets forth the highest classification authorized for the system with instruction to protect the document at that level until the document is finalized. Thus incomplete or draft documents developed under the invention's regimen can be easily identified and located by the security administrator, or become the basis of an alert based on a preset increment of time that the document has existed without a final classification determination.

Figure 2:
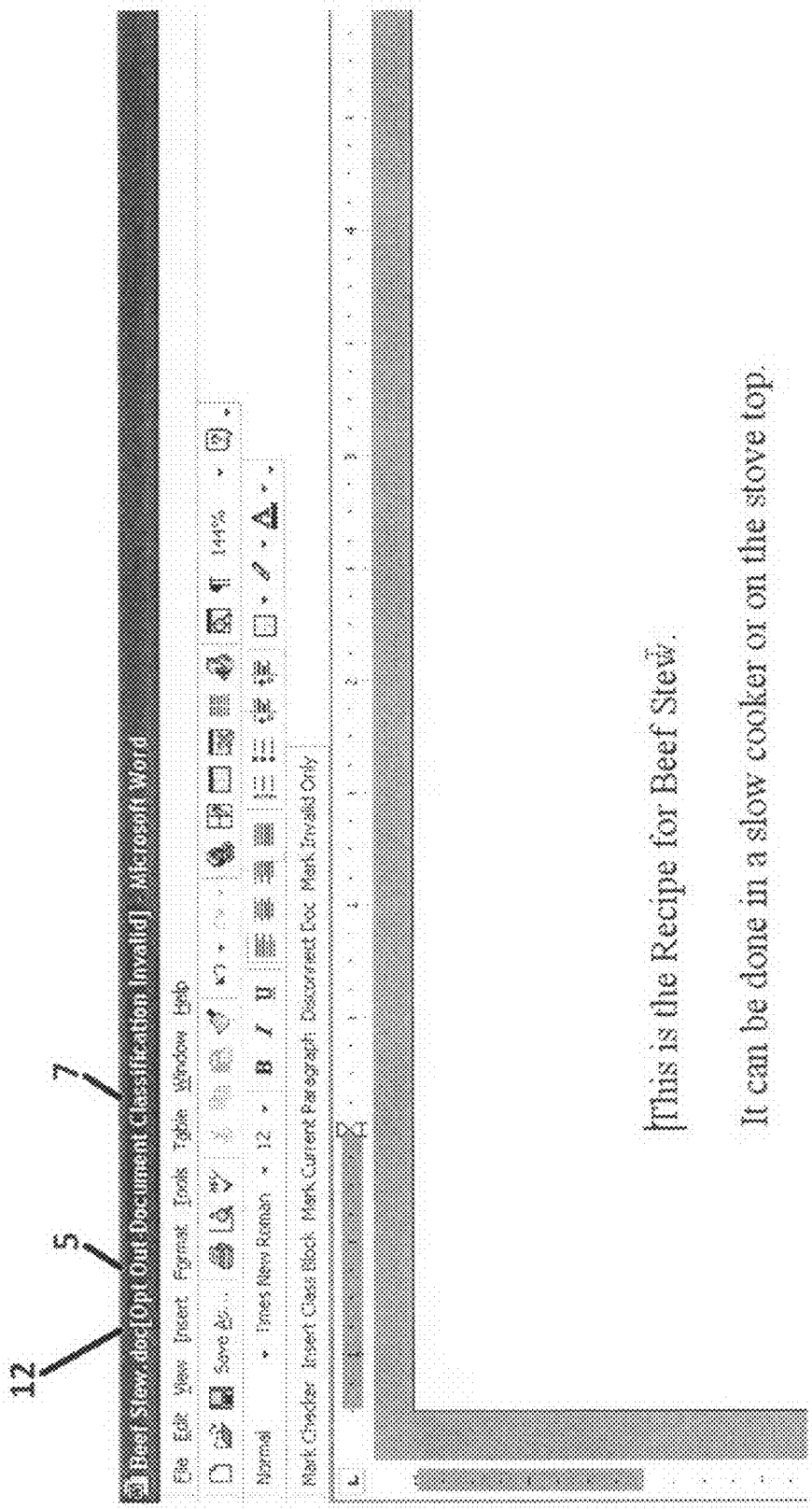
FIG. 2 shows a document identification string in the primary Word application.

FIG. 2 shows a Document Identification String 12 displayed in the primary word processing application. The display provides for a positive identification to all users of document development software on the network of a current status 5 of the document, the type of document, and the document's sensitivity determination 7. This display is consistent across word processing, e-mail, presentation and other document development software formats that the invention enhances and provides the user with critical information about the document that they are accessing even when the document itself has no requirement to incorporate and display sensitivity or classification markings. This process provides the positive, visible feedback for all document users on the system that such documents have or have not completed a final sensitivity or classification determination.

FIG. 3 shows a sample of a compact user classification dialogue tool 27 in FIG. 3. The dialogue may include a classification level section 29; help icon 31, caveats section 33 and a button toolbar 35.

Figure 4A:
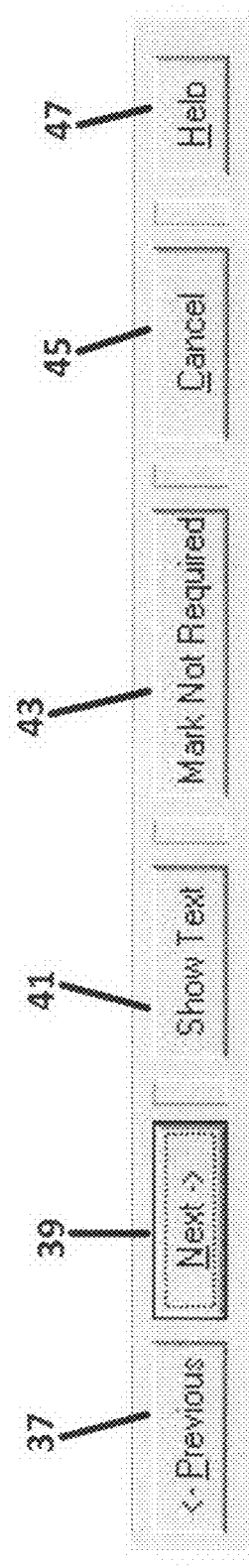
FIG. 4a is a detail of the button toolbar shown in FIG. 2.

FIG. 4a is a detail of the button toolbar 35 in FIG. 3. Buttons may include Previous, 37, Next 39, Show/Hide Text 41, Mark Not Required 43, Cancel 45, and Help 47.

The user classifies a document element by merely selecting/checking buttons to the left of each high-level classification selection 29 in the classification dialogue tool 27. Just as in all classification regimens, the user selects the highest level of classification sensitivity that applies to the information in the paragraph or portion of a document. The paragraph or portion under consideration by the user/classifier is highlighted in the document for ease of use. The classifier then uses his or her judgment to apply caveats 33 to the selected level. Each classification level may have an associated set of caveats that have been pre-determined for use with the particular classification level by the organization.

National security classification guides are largely paper based and are often very broad, duplicative or overlapping; they may refer to depictions of information contained in pictures, graphics, drawings or other non-text representations of the information, or apply classification criteria to compilations of information. Thus the correct application of classification criteria requires substantial human intervention and interpretation to make appropriate sensitivity and classification judgments. Efforts to remove human intervention to fully automate the classification decision process have been unsuccessful and place national security classified information at risk due automated misapplication of criteria. The current invention recognizes the complexity of the national security classification system and other information security classification systems, as well as the human judgment required of such determinations and supports the human decision process by providing the decision classification criteria and guidance information required 31, for such decisions. Such classification criteria and guidance is immediately available to the classifier in a searchable format throughout the classification process by mean of a button click 31. The invention supports the human decision making process in a stepped yet flexible manner with the rigor of an algorithm to ensure that the process is complete and the consistency of an algorithm to ensure that the document marks meet organizational requirements and are not mistyped. However the decision-making process correctly rests with the human originator of the document and is supported by means of the invention's process to provide electronically the classification criteria for immediate search and reference during the classification process.

The classification dialogue tool 27 in FIG. 3 may contain buttons with question marks 31 in each portion of the marking dialogue. These buttons allow the user to access and search any classification guides associated with the classification level or caveat that the user has highlighted. This guidance is in a format that is electronically searchable by the user to ensure that the necessary information for classification decisions is readily available at all times for the user, should the organization choose to use this capability of the invention It should be noted that the initial high-level classification portion 29 of the tool has a MARK NOT REQUIRED radio button as well as an UNKNOWN radio button.

The MARK NOT REQUIRED radio button in the High-Level portion 29 functions in the same manner as the MARK NOT REQUIRED Button 43 described below with the exception that upon selection it does not automatically progress the tool to the next element of the document. After selection of the MARK NOT REQUIRED radio button the user must advance the tool by selecting the NEXT Button 39. When the user selects the MARK NOT REQUIRED radio button the software engine imbeds a non-visible code to indicate that the text element has been considered by the user, but that the organization's classification or format requirements do not require a visible classification mark in the document.

Selecting the UNKNOWN radio button imbeds the document element with a code that indicates that the classification is unknown and will need further consideration at a later time before the document can be properly marked. The user may use the MARK INVALID ONLY button 23 in the tool bar to quickly return to each text item that was marked as unknown. A full description of the MARK INVALID ONLY button 23 is provided below.

Once the user has determined the appropriate High-Level 29 classification radio button, and any associated caveats 33, he or she merely selects the NEXT button and the appropriate visible paragraph or portion mark, if any is required, is inserted into the document text along with non-visible tracking codes and the tool advances to the next portion of the document for the user's consideration.

The user merely repeats this process for each paragraph or portion in the document.

Figure 5:
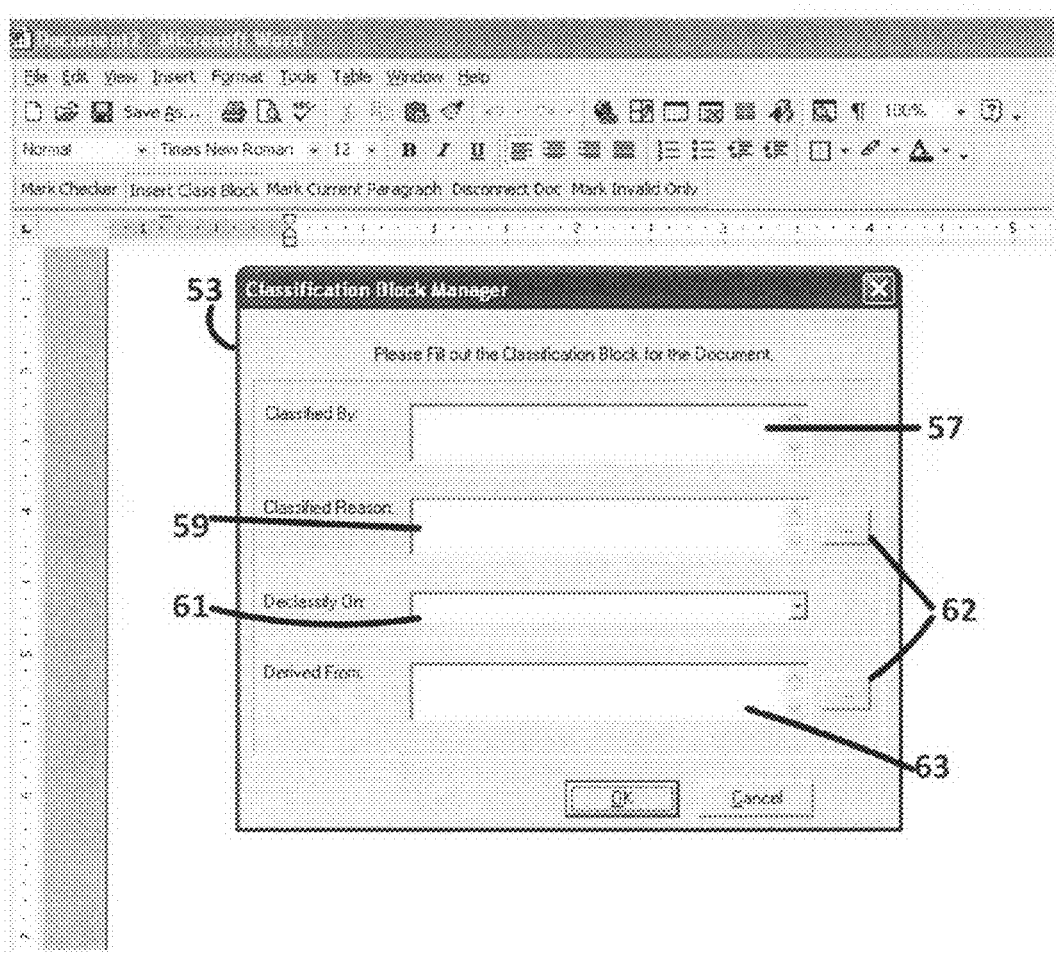
FIG. 5 shows a classification block dialogue tool.

Upon completing the document, the classification tool will prompt the user to provide a classification box 53, FIG. 5, if the user has determined that the document contains national security classified information.

Other elements of the classification tool, as shown in FIG. 4*a*, may include PREVIOUS 37, HIDE TEXT/SHOW TEXT 41, MARK NOT REQUIRED 43, CANCEL 45 and HELP 47 buttons.

PREVIOUS 37—Moves the focus of the classification dialogue tool back to the last document element considered. To move backward through the paragraphs/portions of the document, the user may use this button repeatedly. The user classification interface dialogue displays any classification selection previously assigned to the paragraph or portion of the document allowing for any necessary changes.

Figure 4B:
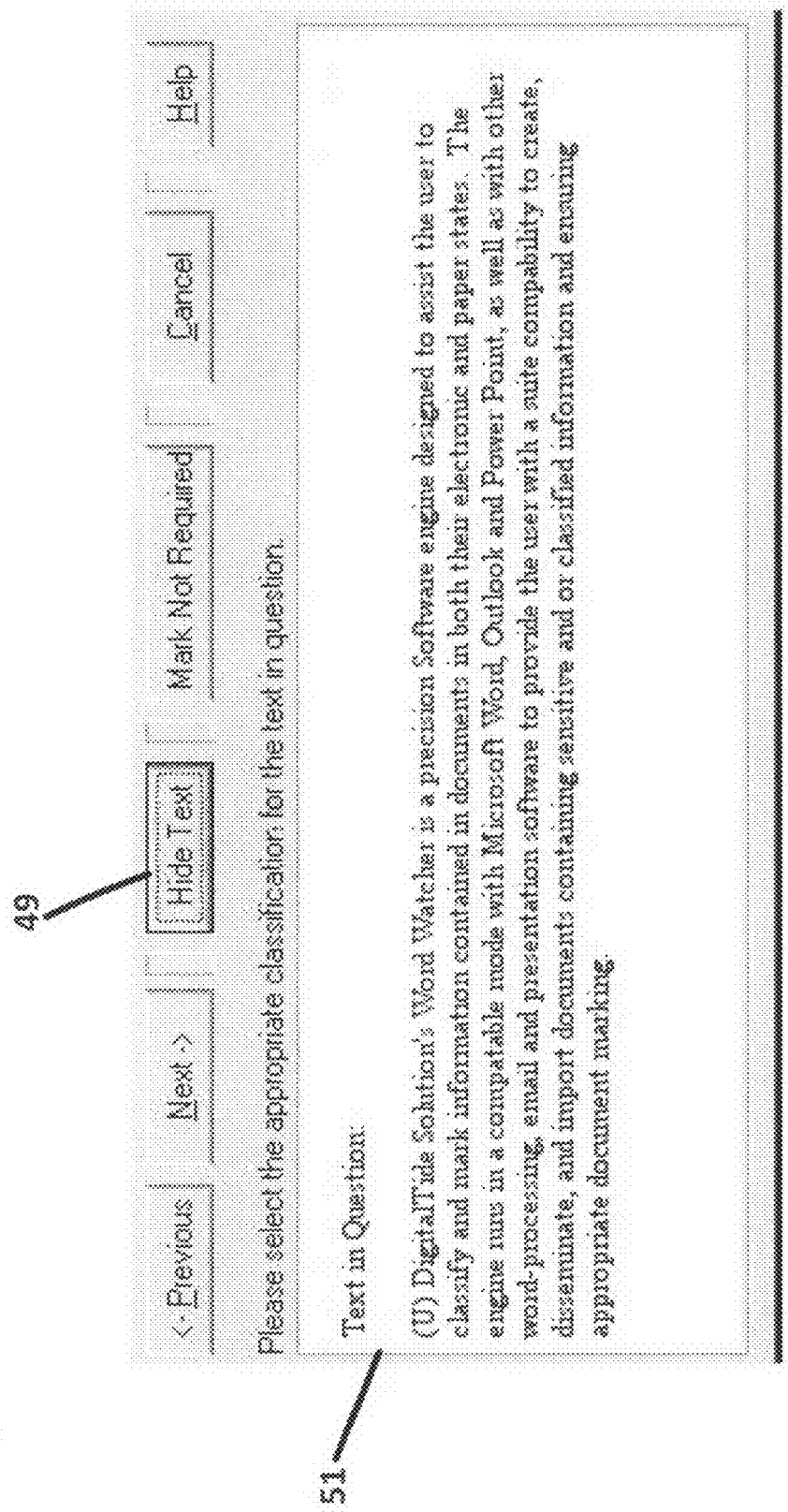
FIG. 4b shows a "text in question" box visible when the "show text" feature is activated.

SHOW/HIDE TEXT 41—Toggles between a view of text under classification consideration for the selected paragraph or portion of the document in an expanded text box within the user classification dialogue, and no view of the text or the expanded text box view of the text. However the paragraph or portion of the document under classification consideration by the user remains highlighted in the body of the document regardless of the status of the Show/Hide Text 41 button selection. The SHOW TEXT button is shown in FIG. 4*a*, a HIDE TEXT button 49 is shown in FIG. 4*b*. A "text in question" box 51 appears when the SHOW TEXT 41 feature is enabled. Depending upon the users preferences, the user can choose to follow the text highlighted in the document by the program, show that same text in the expanded view within the classification dialogue, or some combination of both.

MARK NOT REQUIRED 43—In one step this button codes the document element to identify that the user has considered the classification of the information contained in the paragraph or portion of the document and determined that it does not require a classification mark. This also advances the classification dialogue tool to the next document paragraph or portion.

CANCEL 45—Stops and closes the classification dialogue tool; all previous classification work is retained in the document.

HELP 47—Provides the user with classification dialogue tool help and additional general security and classification information.

Figure 6:
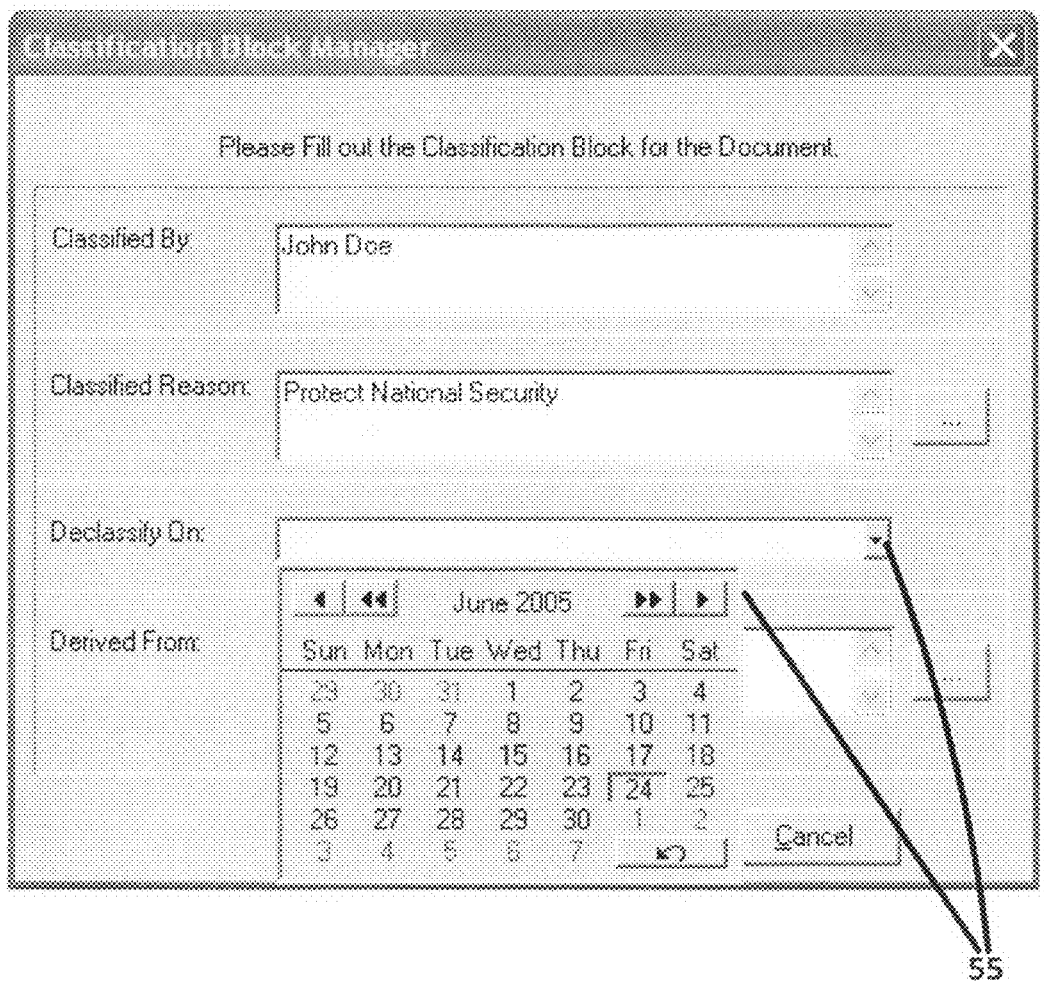
FIG. 6 is a detail of the classification block tool of FIG. 5 with a drop-down calendar tool.

INSERT CLASS BLOCK 17—This tool bar button initiates a classification block tool 53, shown in FIG. 5. Spaces may be provided for information, relating to Classified By 57, Classified Reason 59, Declassify On 61 and/or Derived From 63 all informational elements required by national security directives. It allows the user to provide the appropriate classification information required for national security classified documents. In addition, the classification block tool also provides question mark buttons 62 to quickly access classification guidance and help information directly associated with this portion of the document mark requirement. FIG. 6 shows detail of the class block tool with a drop-down calendar tool 55.

A classification block is a table that is generally pre-positioned on the first page of a national security classified document. If the position of the block is not suitable for a document format it can be moved and resized by the user to fit the document in the manner that tables are normally adjusted in the host software. One of the strengths of the present invention is the ability to standardize the format of classified documents across an agency, program or office with some limited user flexibility to adjust the format for unique circumstance.

MARK CURRENT PARAGRAPH 19, as shown in FIG. 1—This button initiates the classification dialogue tool for the document paragraph or portion upon which the curser rests. It allows the user to quickly, via the dialogue, classify the information in the portion, review an existing classification and/or change an existing classification and to apply the appropriate classification mark.

DISCONNECT DOC 21, as shown in FIG. 1—This button disconnects the document from the document classification and marking portion of the invention's software. While the document classification and marking software handles almost all document configurations and document elements, modern word processing software provides tens of thousands of permutations of document elements and there may occur some elements or combinations thereof that the software has not yet been designed to handle. As a result, the current invention provides flexibility for the user/classifier to address those rare instances. The user is provided a mechanism to disconnect and re-connect a document to the classification and marking portion of the invention software. Disconnecting the document allows the user to classify and mark paragraph and portions of a document manually. In some cases once the problematic portion of the document has been manually marked it may resolve the conflict and the document may be reconnected to the classification and marking software and the classification process via the software can resume. The button works like a toggle to either disconnect a document that is connected or to connect a document that has been previously disconnected or never connected. The status of the document to include whether or not the document is connected to the software is always displayed in the Document Identification String 12, FIG. 2. Disconnecting a document from the classification and marking portion of the software invention does not disconnect the document from the invention's rigorous document tracking and oversight portions of the software invention. Each disconnect from the invention's classification and marking process is registered as a warning or alert in the System Security Administrator's data viewing tool. The software that is the invention, requires that the user provide a reason for each disconnect, and captures the overall classification of the document from the user. The tracking, control and oversight portions of the invention software continue to function for a document disconnected from the classification and marking portion of the invention.

MARK INVALID ONLY 23—This button shown in FIG. 1 initiates the classification dialogue tool 27 shown in FIG. 3, but the tool only advances to document portions that have not been properly classified. This mode of the classification dialogue tool enables the user to quickly find and assess document potions not properly marked, or marked as UNKNOWN via an earlier session of the classification dialogue tool.

The software engine of the present invention may include much specific functionality to ensure the security of documents. For example, features require users to consider classification for partial paragraphs and other segments in unusual situations. The software of the present invention may be run separately after the creation of a document. Alternatively, the software is flexible and can be run as many times as the user wants during the development of a document.

The software engine provides for user flexibility and conforms to typical user document development processes and does not lock users into organizationally stilting procedures to which they are unaccustomed. For example, it is natural for some users to develop documents in stages, the software allows for this behavior and can be run on documents as often as required. Additionally, some documents are subject to peer or supervisory review. The software supports such organizational processes and even monitors if changes made to the document have not been accepted and reviewed and considered for their potential sensitivity/classification.

A progress bar may be located in the upper left hand corner of the screen as the program runs. The program runs prior to all saves to determine and record the current status of the document in the classification process.

Supervisors and other individuals, who may need to review the classification decision of the original developer, can use the present invention to step through the decision process of the document originator. The classification dialogue shows classification decisions made by the originator and allows the secondary review to make any necessary classification changes and or caveat adjustments via the dialogue.

The present invention will accept any classification mark that the user types into the document manually, as long as the mark meets the format requirements preset by the organization via the invention's administration tool.

The user Classification Interface Dialogue Tool 27 described above represents the front end of a multi-part system that is the invention. The Classification Interface Dialogue Tool is resident on each computer on a network of computers, but it is controlled by a central service that is resident on a network server. The Classification Interface Dialogue Tool provides the users of the network with an easy to use interface to make sensitivity or classification determinations, with the assurance that his or her efforts comply with organizational standards, but the Classification Interface Dialogue Tool also provides for the registration of the document classification or sensitivity as well as the registration and the collection of other document information on the network server that enables additional critical security rigor for the protection of the information contained in electronic documents. In addition, to the front end Classification Interface Dialogue Tool, another portion of the software engine that is the invention breaks down the computer network or system of networks into elements that can be associated, tracked and monitored 130, as shown in FIG. 23, such as system users, electronic documents, storage media, individual computer machines, and networks of computer machines. The software engine assigns and registers a unique identification code to each element. The invention registers each identification code in a relational structure in a central service server 136. Simultaneously, the software engine embeds the unique identification codes, in a persistent manner, in each element 134, with the exception of the User, whose unique identification 130 allows access to the system. The software engine constantly monitors user or system initiated events 132 and records changes in the relationship of the system elements 136. The structure and process of this portion of the invention enables the System Security Administrator to establish, alarm, flag or warning criteria across a network or system of networks in response to changes in the monitored relationship of elements 138. In addition, the software engine provides a visual tool interface 140 (see also 57, 59 in FIG. 7 and FIGS. 9 and 10) of the information tracked by the invention across the relationship of the tracked and monitored system elements. The visual interface provides for ad hoc security analysis by security personnel. This part of the system's activities is generally not known to the user, and occurs in the background. That previously described as well as the following is an example of one embodiment of the present invention. Various alternatives and alterations are possible to configure the present invention to each organizations specifications.

The aspect of the invention that establishes the persistent relational tracking system across the network allows for additional functionalities. For example, some security requirements proscribe a periodic audit of the storage media that contains sensitive and/or classified information. This can be a laborious and hands-on exercise involving expensive travel of audit and investigative teams to remote locations of the network. Not only does the invention monitor the content of such media in real time, but the information captured by the software engine would allow a System Security Administrator to set a date or time period, with little advance notice, for all facilities with network nodes and request to have all storage media "touch" the network during the period. This would provide positive feedback that the media exists and is in fact in the facility that it is suppose to be in. Obviously, if media did not touch the system in the required period, as monitored remotely by the System Security Administrator, it may be indicative of lost, stolen or otherwise poorly controlled media. Scarce audit and investigative resources could be more efficiently directed to concentrate on those facilities with storage media control problems. Additionally, the invention mechanism provides for continual analysis of document storage media and identifies any media where documents have been accessed or altered while the media was not connected to the approved network. The invention provides for these and other related audit functionality.

Figure 7:
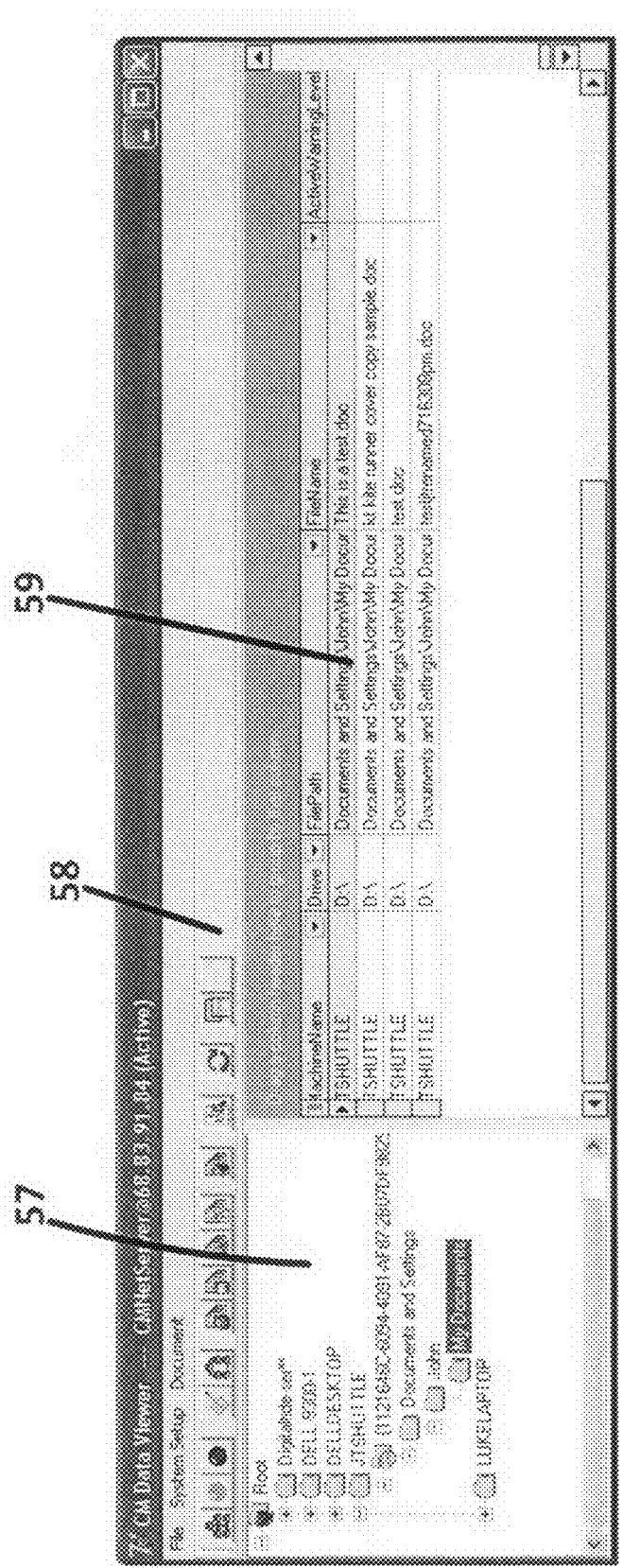
FIG. 7 shows a server data viewer and report generation (DVRG) interface for the System Security Administrator.

The central controlling service on a network server also provides the System Security Administrator with the tools to develop and establish the sensitivity or classification criteria for the organization/network, establish format requirements, setup user profiles to compartment user access to information on the network, as well as provides for document monitoring and warnings and alarms. The following provides a more detailed description of the Server Service preferred embodiments:

FIG. 7 shows a possible embodiment of the Server display interface. The display sets forth three areas; the Machine and Media display area 57, the Document Information Display area 59 and the Button Tool Bar 58. The Machine and Media display area 57 allows the System Security Administrator to identify and view activity on individual machines and storage media registered across the network. The information on individual documents developed or accessed by system users 59 is associated with the user, the machine or computer used by the user, the electronic storage media used as well as the network and is registered on the system.

The Button Tool bar 58 provides for more specific functionality relating to the machine, media, or document information, such as alternate views, warnings and alarms, or log information, or to the development, configuration and maintenance of the system.

Figure 8:
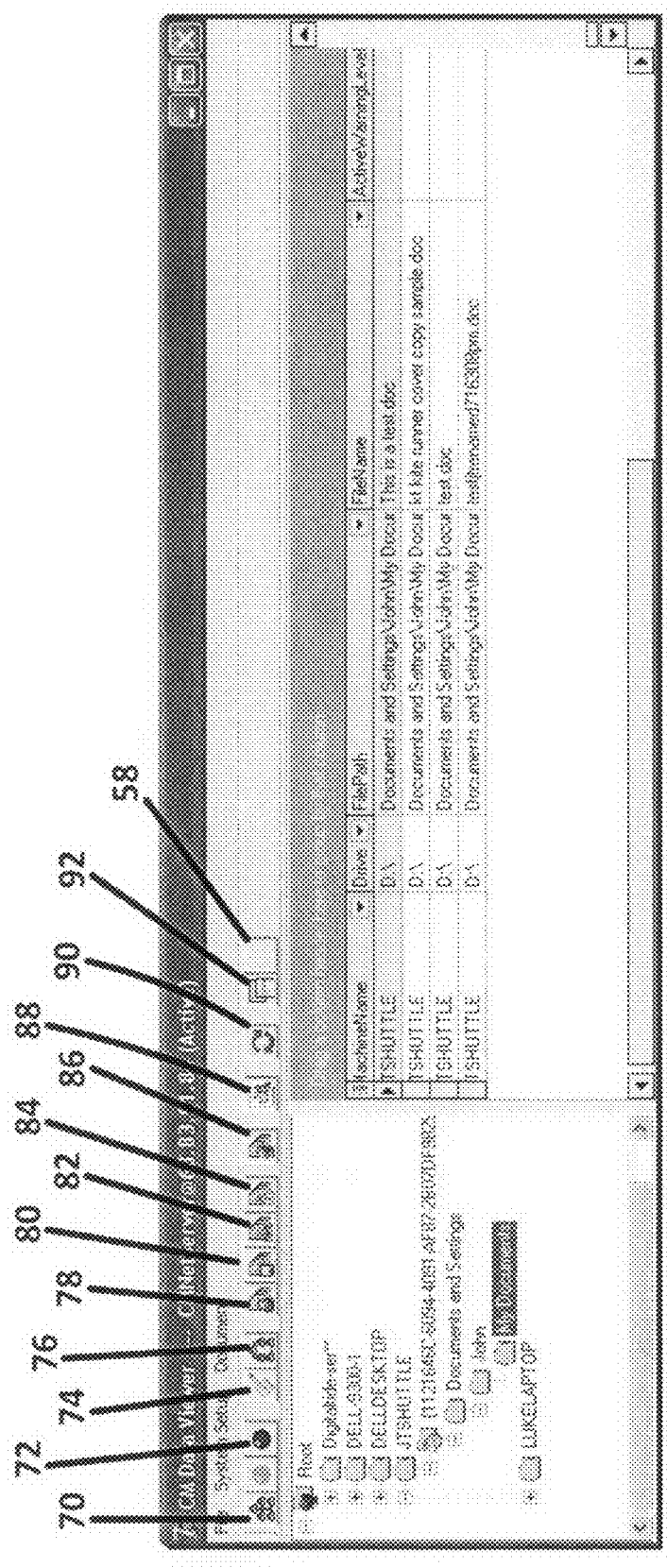
FIG. 8 is a detail of the Button Tool Bar for the server DVRG interface.

The Button Tool Bar functionality is identified in FIG. 8.

The Start Button 70 connects the server interface with the server.

The Termination Button 72 disconnects the display from the server.

Figure 11:
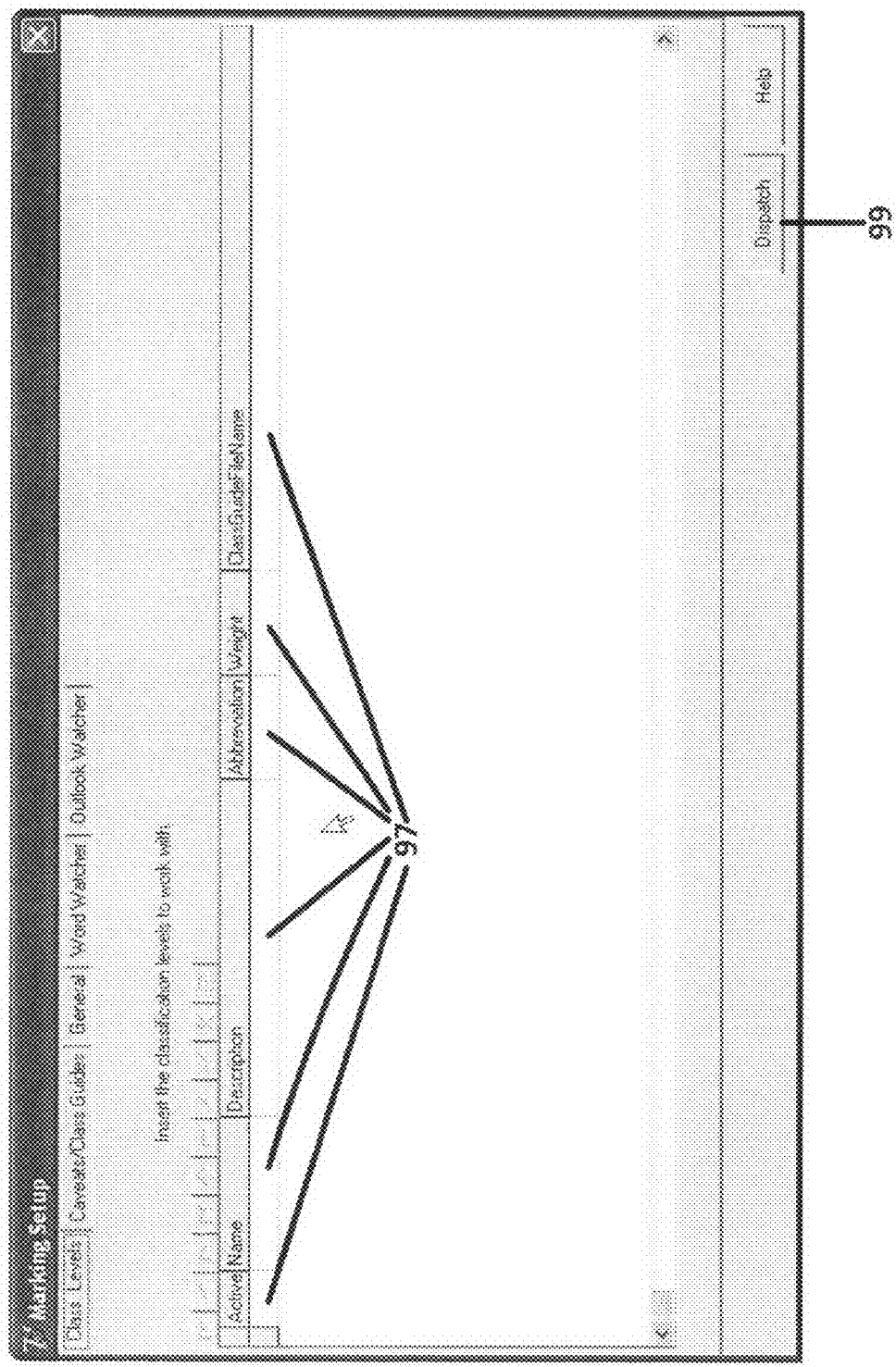
FIG. 11 shows the invention Configuration and Maintenance (CM) interface for the System Security Administrator and detail for the High-Level configuration.

The Configuration and Maintenance Button 74 opens the development and configuration dialogue shown in FIGS. 11 through 15. This dialogue allows the System Security Administrator to develop and establish the classification criteria, formats and requirements for the system. FIG. 11 shows a possible interface to set the High-Level classification designators as well as potential criteria fields that need to be captured 97. In each element of the Security Administrator's interface FIGS. 11 through 15 there is a dispatch Button 99 that promulgates the settings or changes to the settings across the network or system of networks.

Figure 12:
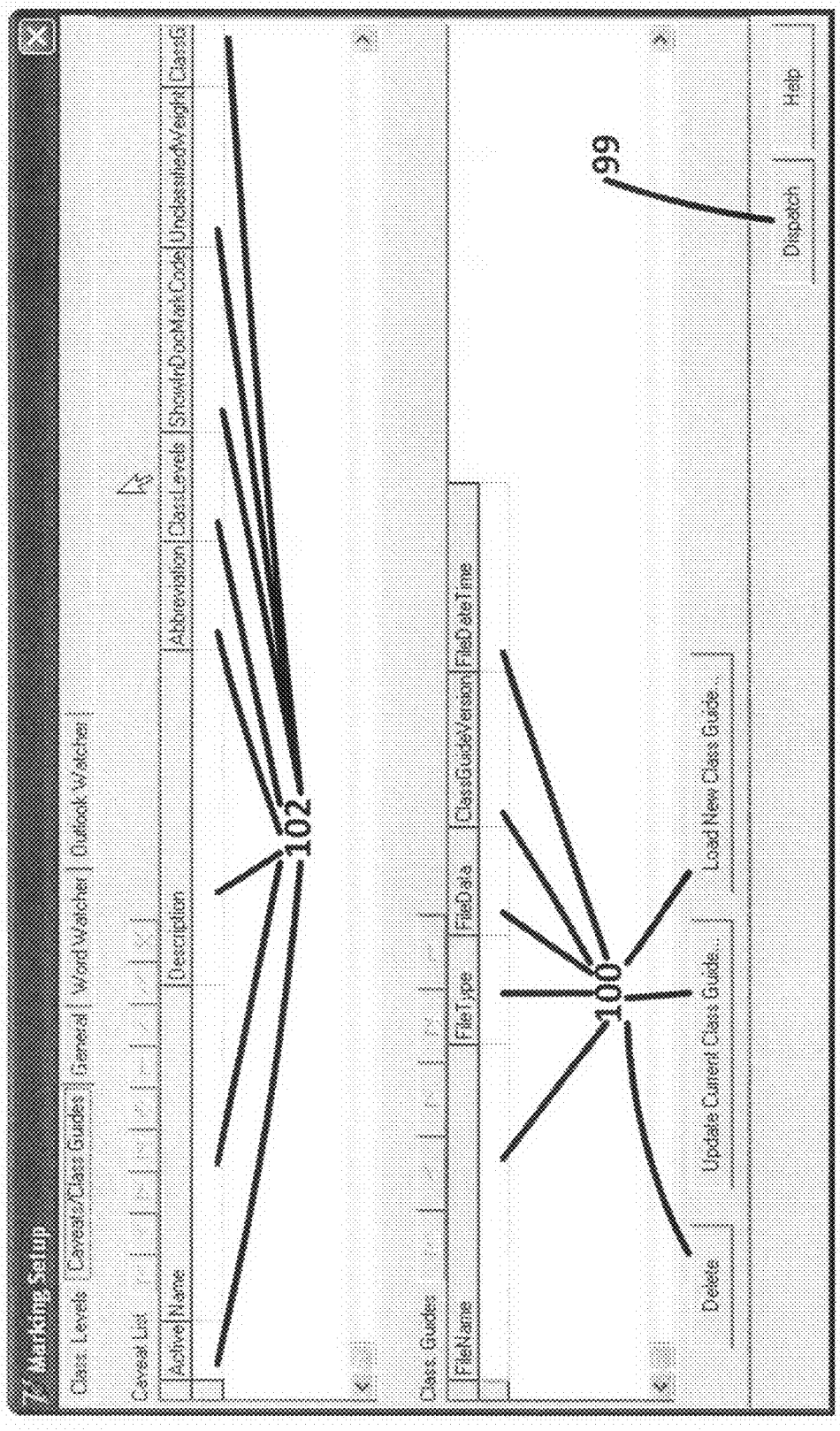
FIG. 12 is a detail of the CM Caveats and Classification Guides Criteria configuration.

FIG. 12 shows a possible interface and criteria requirements to set up caveats 102 and handling designators and associate Classification Guidance and security information files 100 with the caveats and High-level designators.

Figure 13:
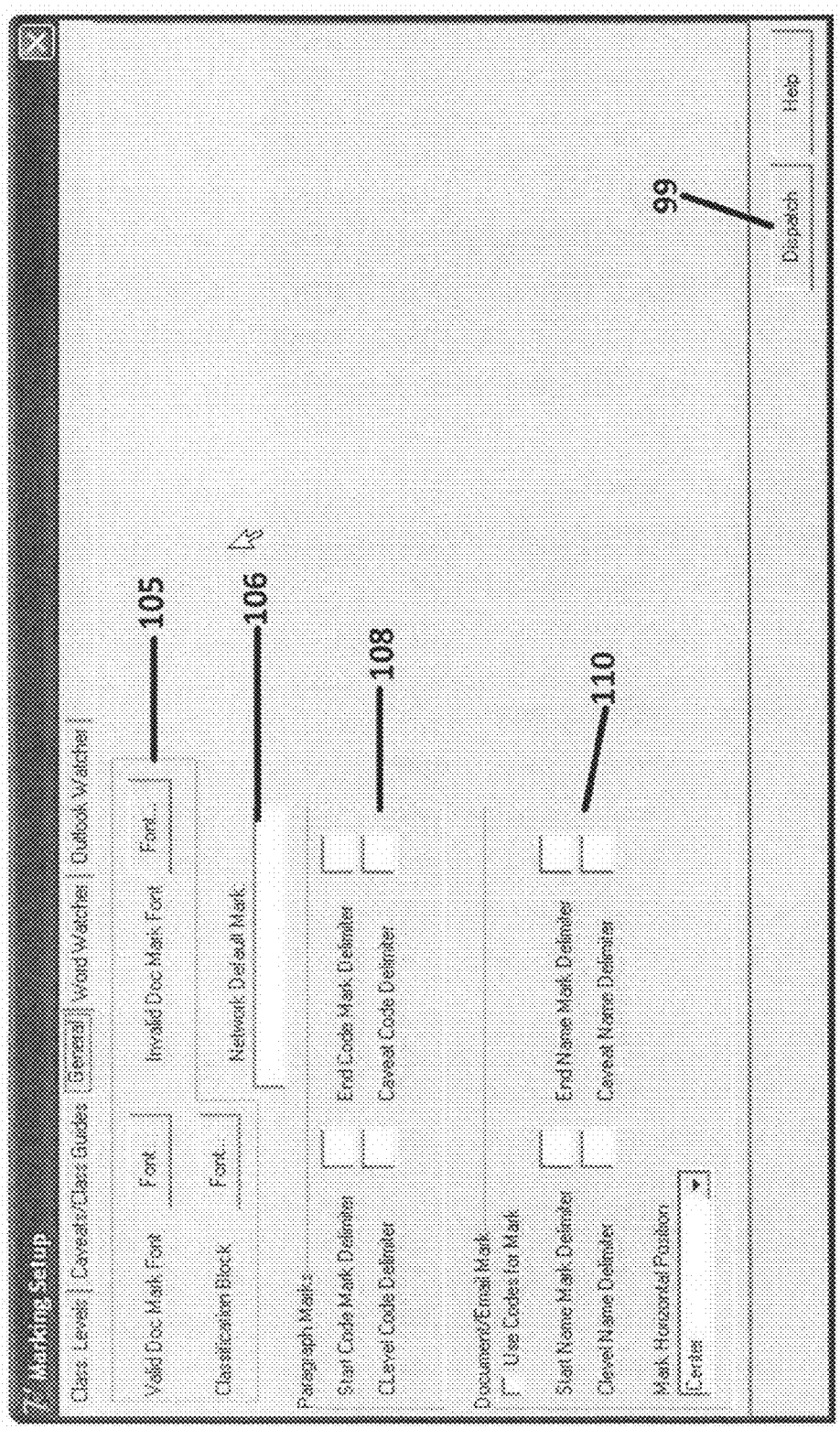
FIG. 13 is a detail of the CM General System Criteria configuration.

FIG. 13 shows a possible interface to set up and control general system criteria and functionality. The interface allows for format control 105, setting a system high default mark 106, general configuration criteria for document paragraph marks 108, and special criteria and considerations for documents and e-mail 110.

Figure 14:
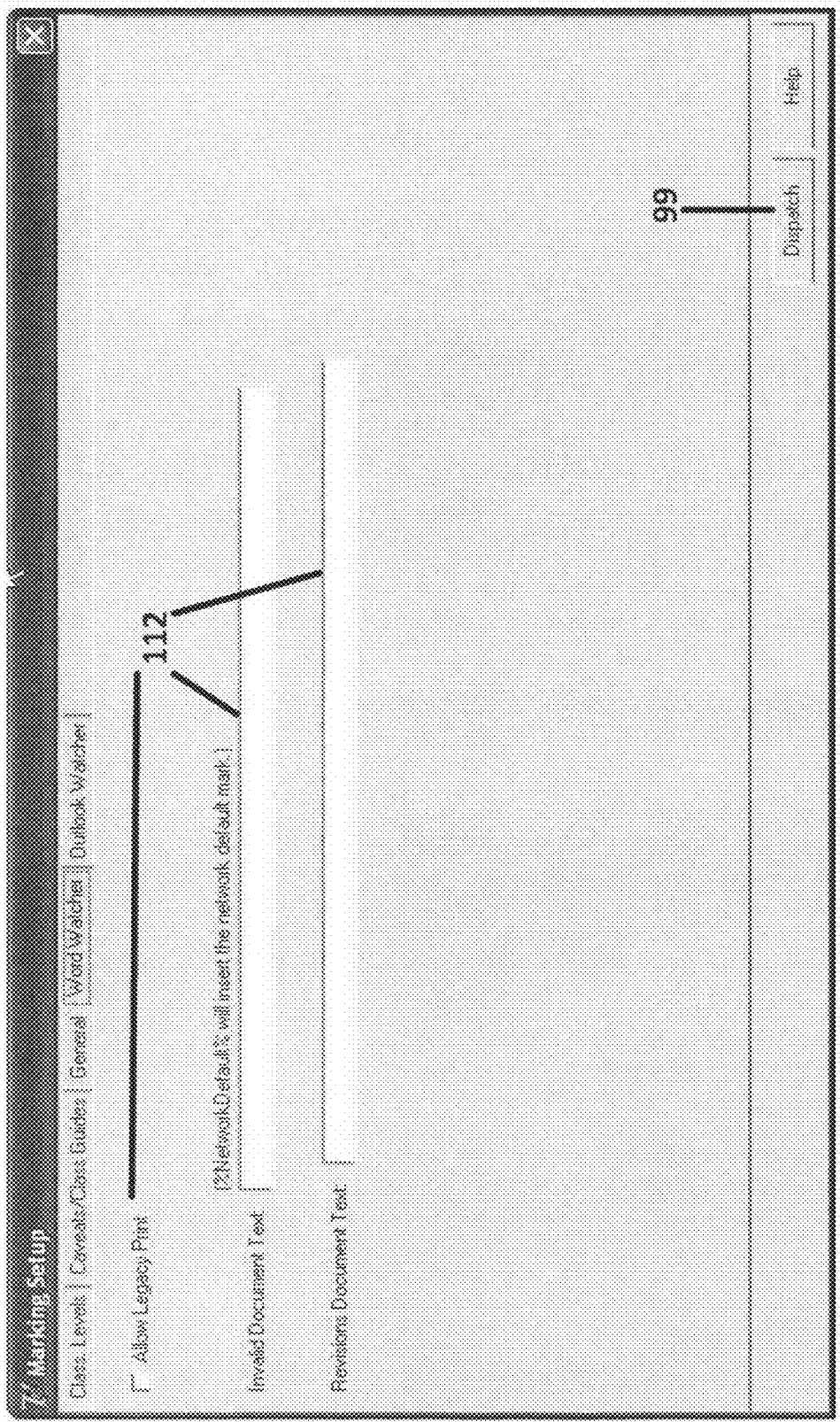
FIG. 14 is a detail of the CM Document Criteria configuration.

FIG. 14 shows a possible interface to capture and set additional criteria for documents and printing 112.

Figure 15:
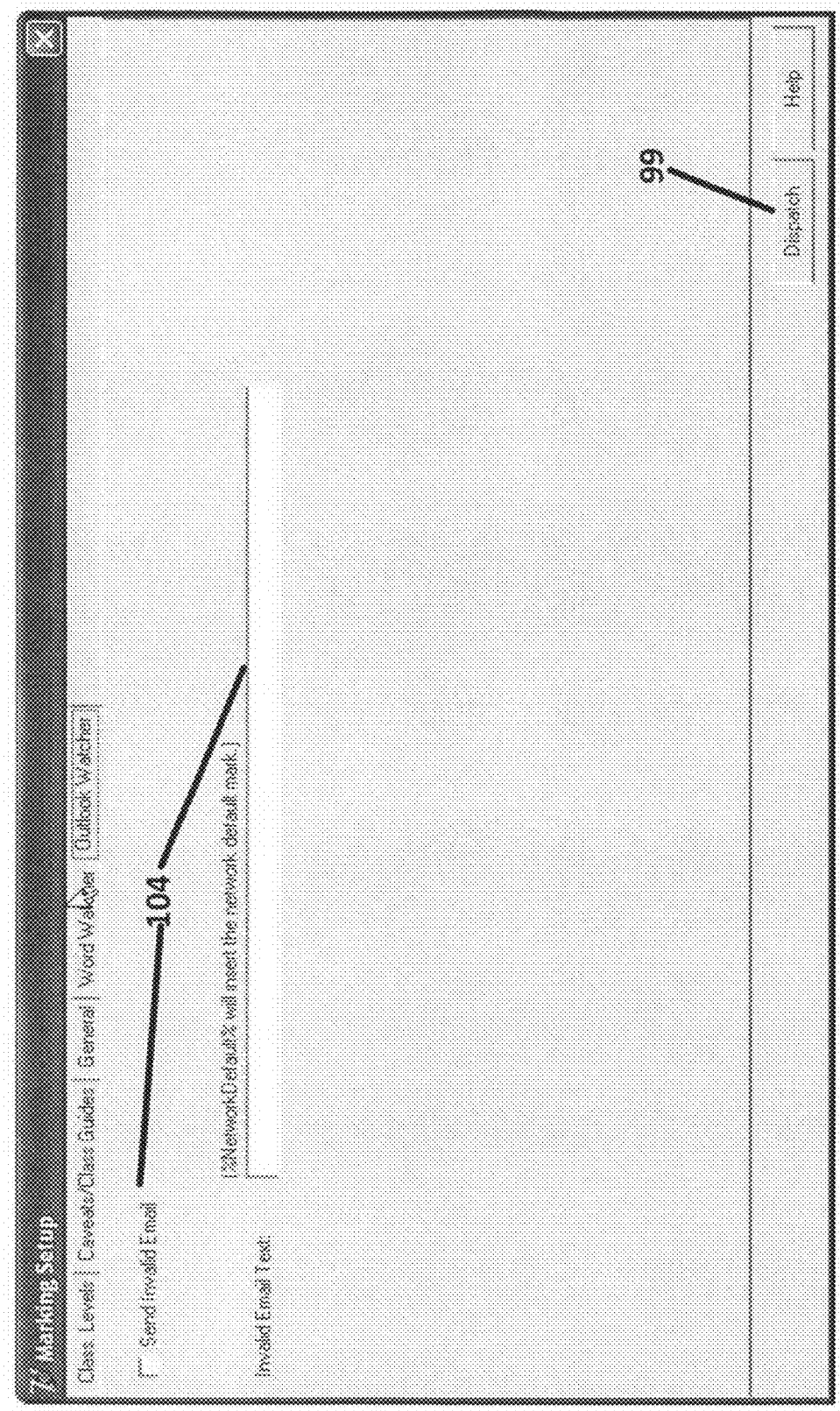
FIG. 15 is a detail of the CM E-mail Criteria configuration.

FIG. 15 shows a possible System Security Administrator interface to capture, set and/or maintain additional criteria as it relates to controlling e-mail documents 104.

The Server Register Button 76 in FIG. 8 refreshes the machine, media side 57 of FIG. 11.

The Button Tool Bar 58 also contains several display buttons that show information views on individual documents selected in the Document Information Display 59 of FIG. 7. In FIG. 8 the View Print Log button 78, View Save Log button 80, View Document Viewed button 82, View Warnings Log button 84, View Document Properties button 88 all provide a specific view of information pertaining to an individual document and the Refresh Button 90 updates all information in the display from the server. Other buttons are possible.

Figure 9:
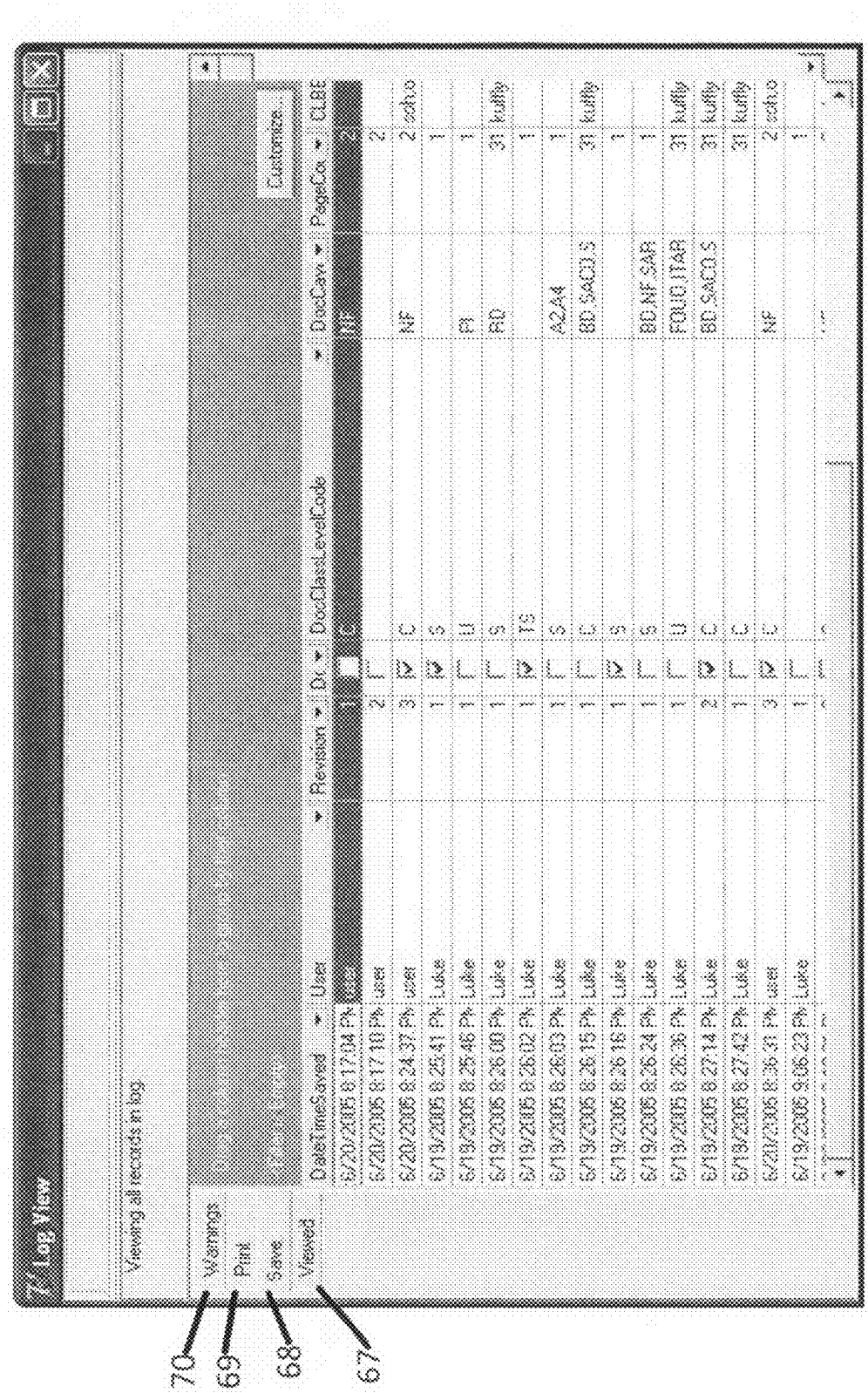
FIG. 9 is a detail of the View All Logs button result on the DVRG Button Tool Bar.
Figure 10:
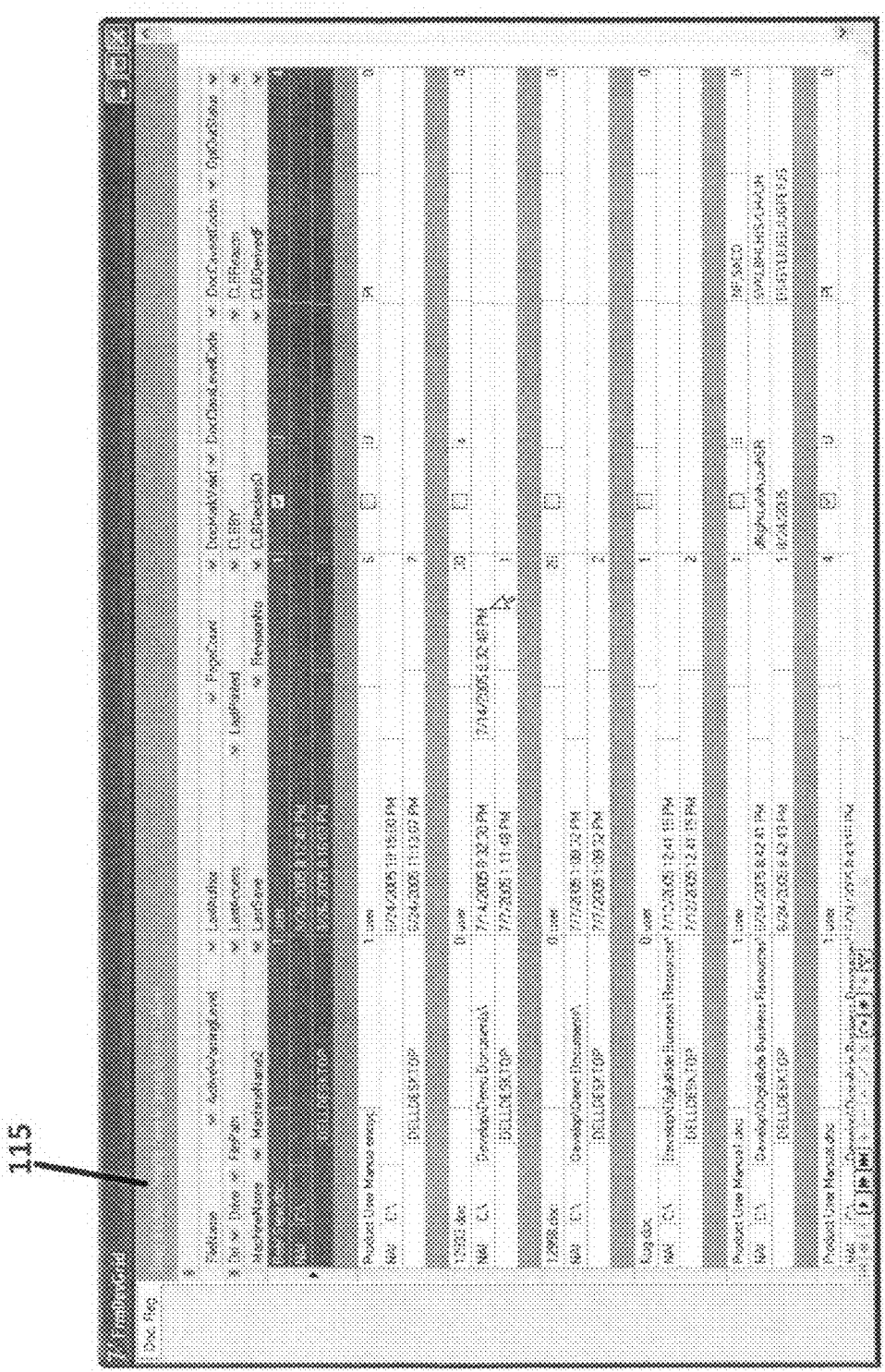
FIG. 10 is a detail of the Show Grid button result on the DVRGButton Tool Bar.

Alternate views of the information contained in the System Security Administrator interface FIG. 8, are provided by the View All Logs button 86, which provides a view of all system logs FIG. 9. The document information in the all log display is categorized into Viewed 67, Saved 68, Printed 69 and Warnings 70. The Grid View button 92, FIG. 8, provides another alternate and powerful view of the document information. Selecting this button provides a possible view of document and system information represented in FIG. 10. Such grid views of the information allow the System Security Administrator to sort and align the information in order to develop system macro views of document storage media, computer or network activity that might identify anomalies with security implications. The Administrator can sort and reorder the information in virtually unlimited possible combinations by dragging the data field to the sort and arrange area of the display 115.

Figure 18:
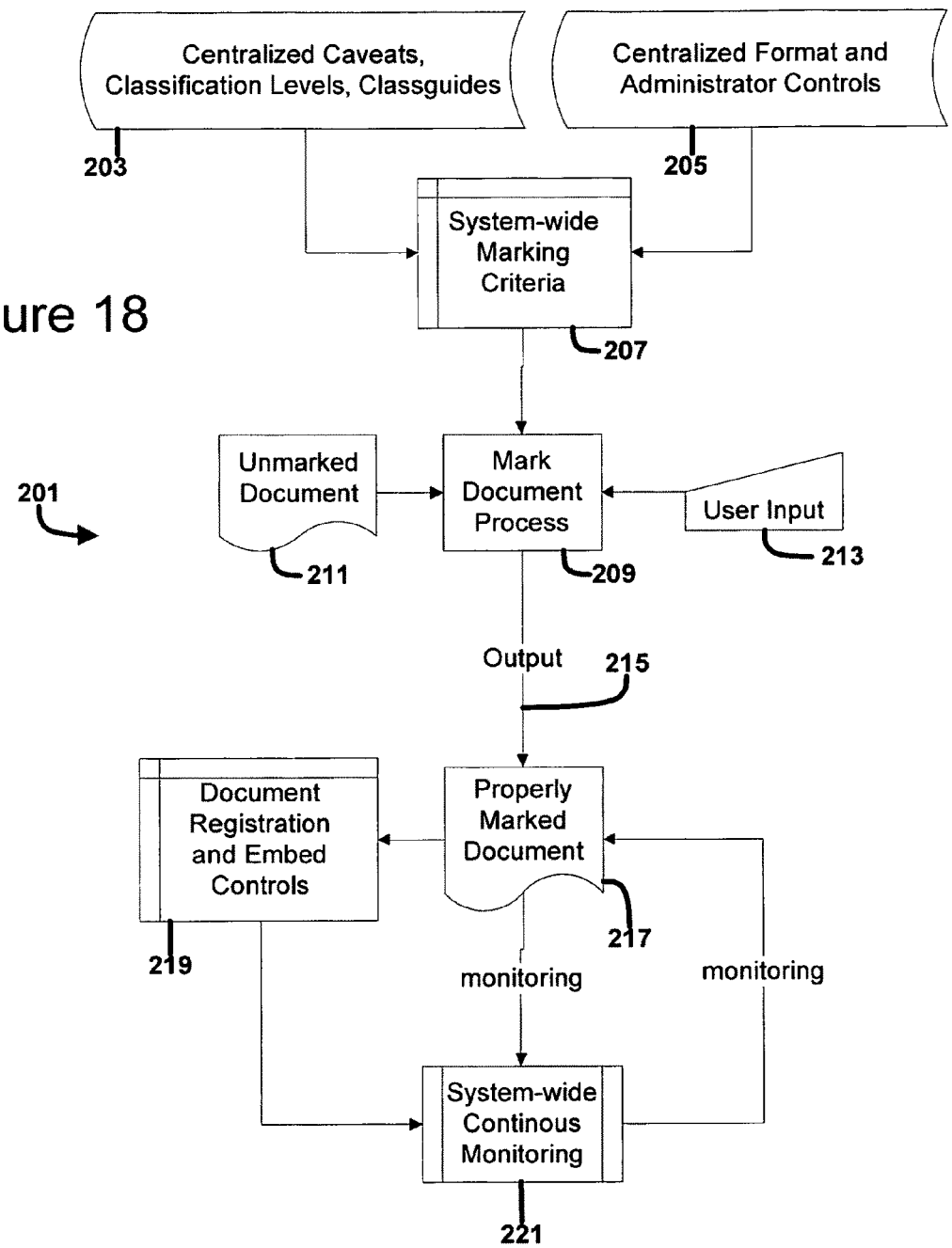
FIG. 18 is a simplified flowchart of process of the present invention.

FIG. 18 is a simplified flowchart 201 of process of the present invention. Centralized caveats, classification levels and class guides 203 are combined with centralized format and administrator controls 205 in a system wide marking criteria 207. The system wide marking criteria 207 is used in a mark document process 209. An unmarked document 211 is marked 209 based upon user input 213. The result of the system wide marking process 209 is an output 215. The output 215 is a properly marked document 217. The document is registered and controls are embedded 219. Both the properly marked document 217 and the document registration and embedded controls 219 are continuously monitored system wide 221. Changes identified by the monitoring 221 are fed back into the properly marked document 209 with associated registration and embedding of controls 219.

Figure 19:
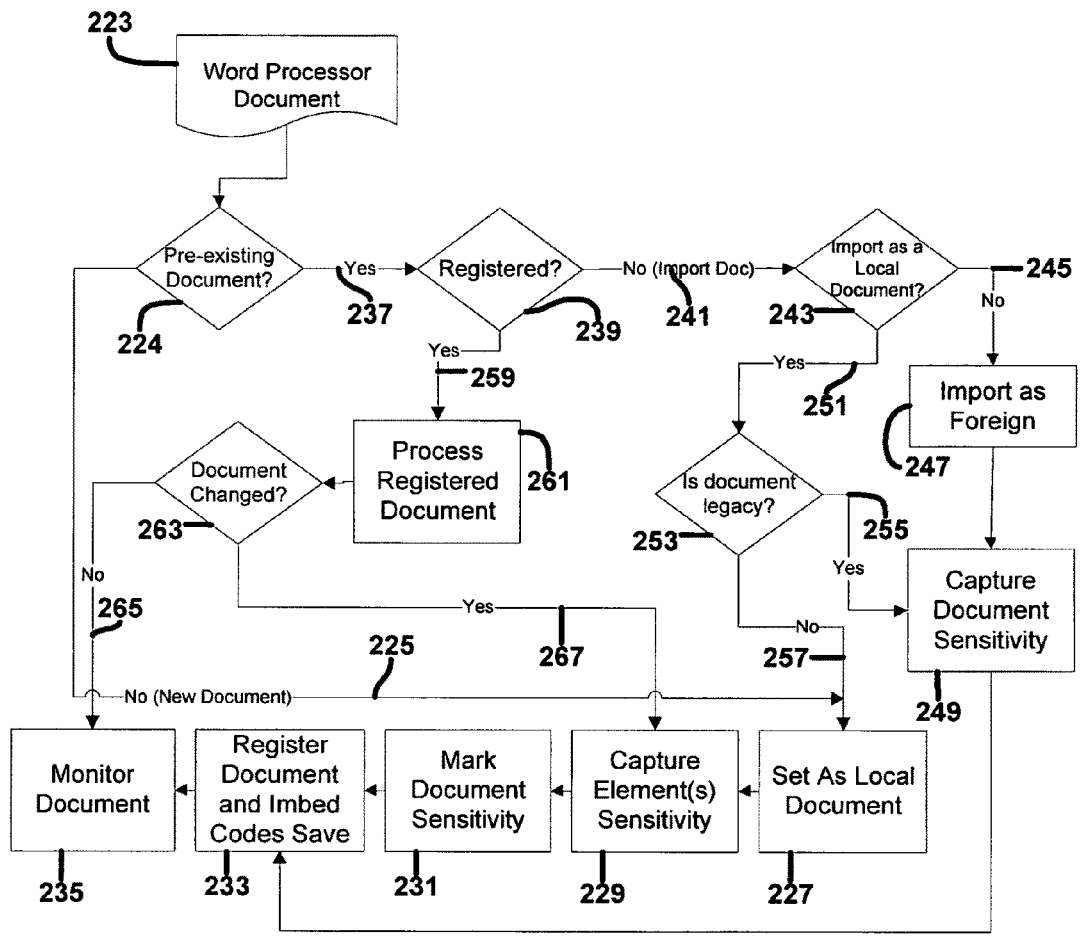
FIG. 19 is a process flowchart for word processing documents.

FIG. 19 is a process flowchart 222 for word processing documents 223. A determination 224 is made as to whether the document 223 is a new document 225. If the document 223 is new 225, the document 223 is set as a local document 227. The document 223 is then passed through capture element sensitivity 229 and then document sensitivity is automated 231. The document 223 is then registered and saved 233. The document 223 is then monitored 235.

If the document 223 is a pre-existing document 237, a determination is made as to whether it is registered 239. If it is not registered 241, then a decision 243 is made as to whether to import the document 223 as a local document. If the document 223 is not a local document 245 it is imported as a foreign document 247 and document sensitivity is captured 249. The document is then registered and saved 233 and monitored 235. If the document 223 is a local document 251, a determination 253 is made as to whether the document is a legacy. If the document 223 is a legacy 255 the sensitivity is captured 249, The document 223 then registered and saved 233 before monitoring 235. If the document 223 is not a legacy 257, it is set as a local document 227. The document 223 is then passed through capture element sensitivity 229 and then document sensitivity is automated 231. The document 223 is then registered and saved 233. The document 223 is then monitored 235.

If the document 223 is registered 259, the document 223 is processed as a registered document 261. A determination 263 is then made as to whether the document 223 has changed. If the document 223 has not changed 265, then it is monitored 235. If the document 223 has changed 267, the document 223 is then passed through capture element sensitivity 229 and then document sensitivity is automated 231. The document 223 is then registered and saved 233. The document 223 is then monitored 235.

Figure 20:
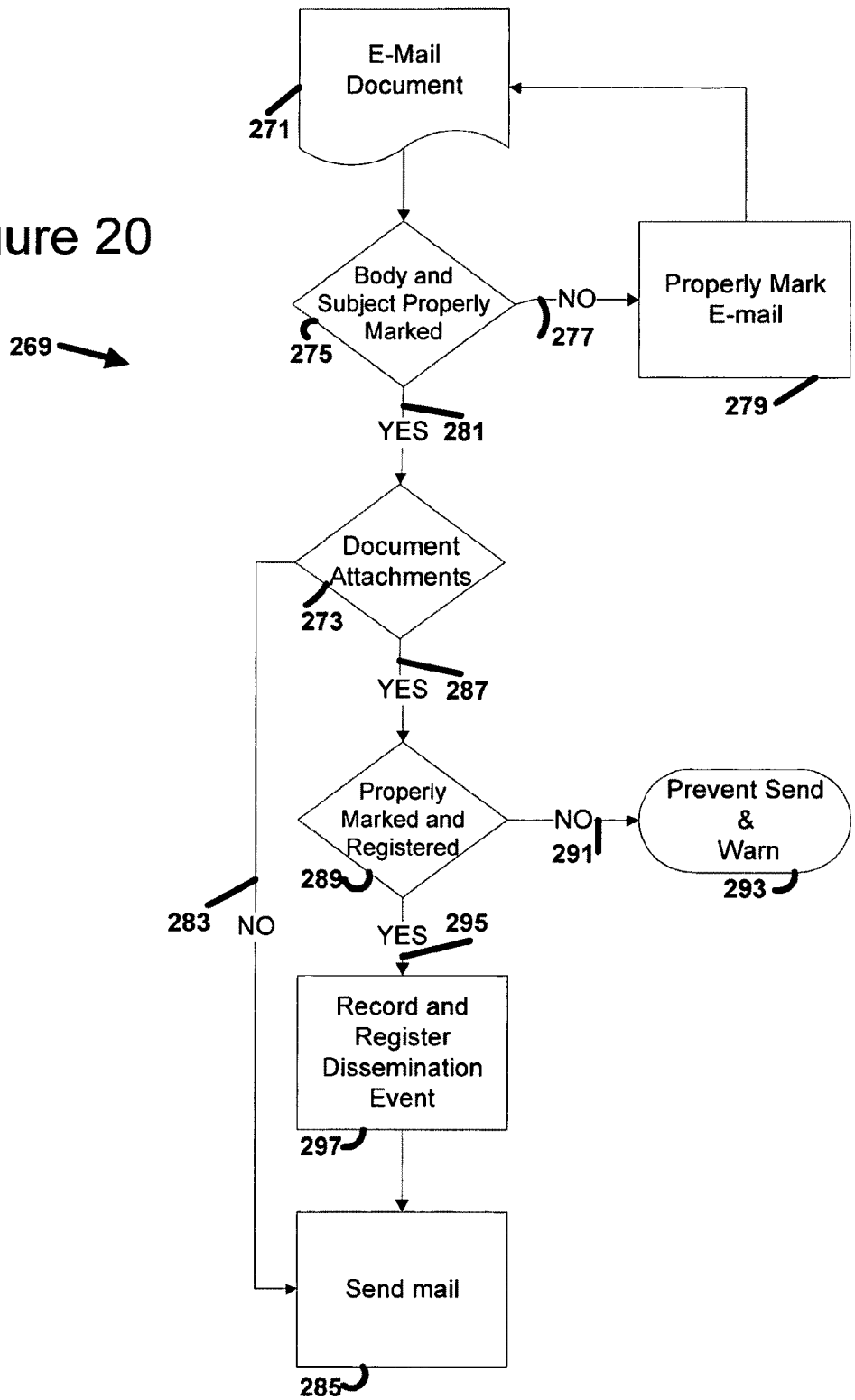
FIG. 20 is a process flowchart for e-mail and attachments.

FIG. 20 is a process flowchart 269 for an e-mail document 271 and document attachments 273. A determination 275 is made as to whether an e-mail document 271 is properly marked in the body and subject line of the e-mail document. If the e-mail document 271 is not properly marked 277, it is properly marked 279 and checked again for proper marking 275.

If the e-mail 271 is properly marked 281, the e-mail 271 is checked 273 for document attachments. If there are no attachments 283, the e-mail is sent 285. If the email 271 has attachments 287, the attachments are checked 289 for proper marking and system registration. If they are not properly marked or registered 291, sending is prevented, and a warning is issued 293. If the attachments 287 are properly marked and registered 295, the dissemination event is recorded and registered 297, the e-mail 271 and properly marked attachments 287 are then sent 285.

Figure 21:
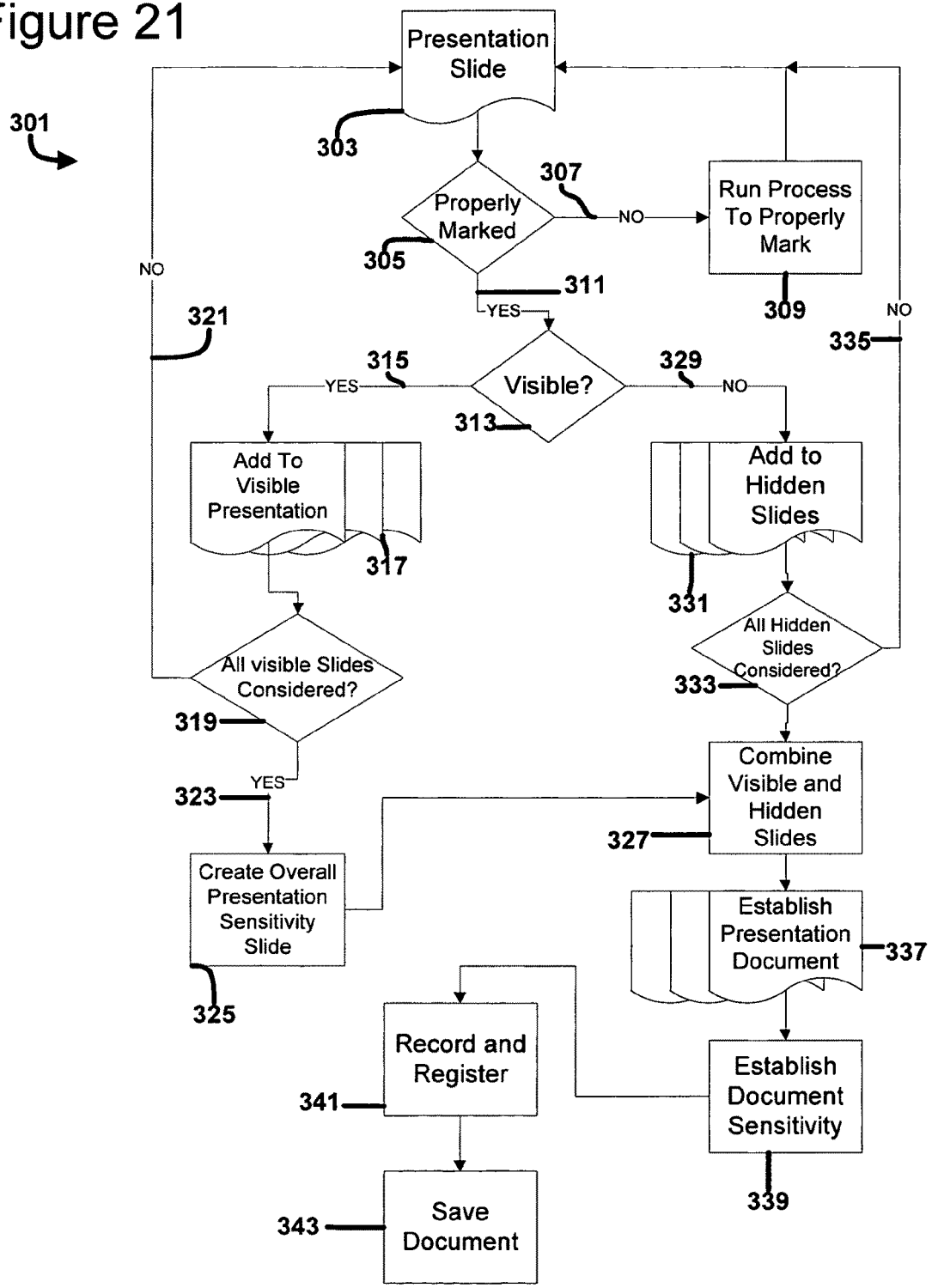
FIG. 21 is a process flowchart for presentation software.

FIG. 21 is a process flowchart 301 for presentation software and slide document 303. A determination 305 is made as to whether the slide document 303 is properly marked. If the slide document 303 is not properly marked 307, a process 309 is run to properly mark the slide document 303 and the slide document 303 is checked again 305.

If the slide document 303 is properly marked 311, a determination 313 is made as to whether the slide document is visible for presentation. If the slide document is visible 315, the slide document 303 is added to the visible presentation 317. A determination 319 is then made as to whether all visible slides have been considered. If not 321, the next slide document 303 is checked for proper marking 305. If all visible slide documents have been considered 323 an overall slide document is generated that depicts the sensitivity of the visible presentation and is inserted into the presentation 325. All visible slide documents 303 are then combined with all hidden slide documents 327.

Properly marked slide document 303 with markings that are not visible for presentation 329 are added to hidden slides 331. A check is done to determine whether all hidden slide documents have been considered 333. If a hidden slide documents has not been considered 335, the next slide document 303 is checked for proper marking 305. If all the hidden slide documents have been considered, they are combined with the visible slide document(s) 327.

The combined visible and hidden slide documents 327 are then established as a presentation document 337. Overall presentation document sensitivity is then established by considering the sensitivity established for each hidden or visible slide document 339. The presentation is then recorded and registered 341 before saving 343.

Figure 22:
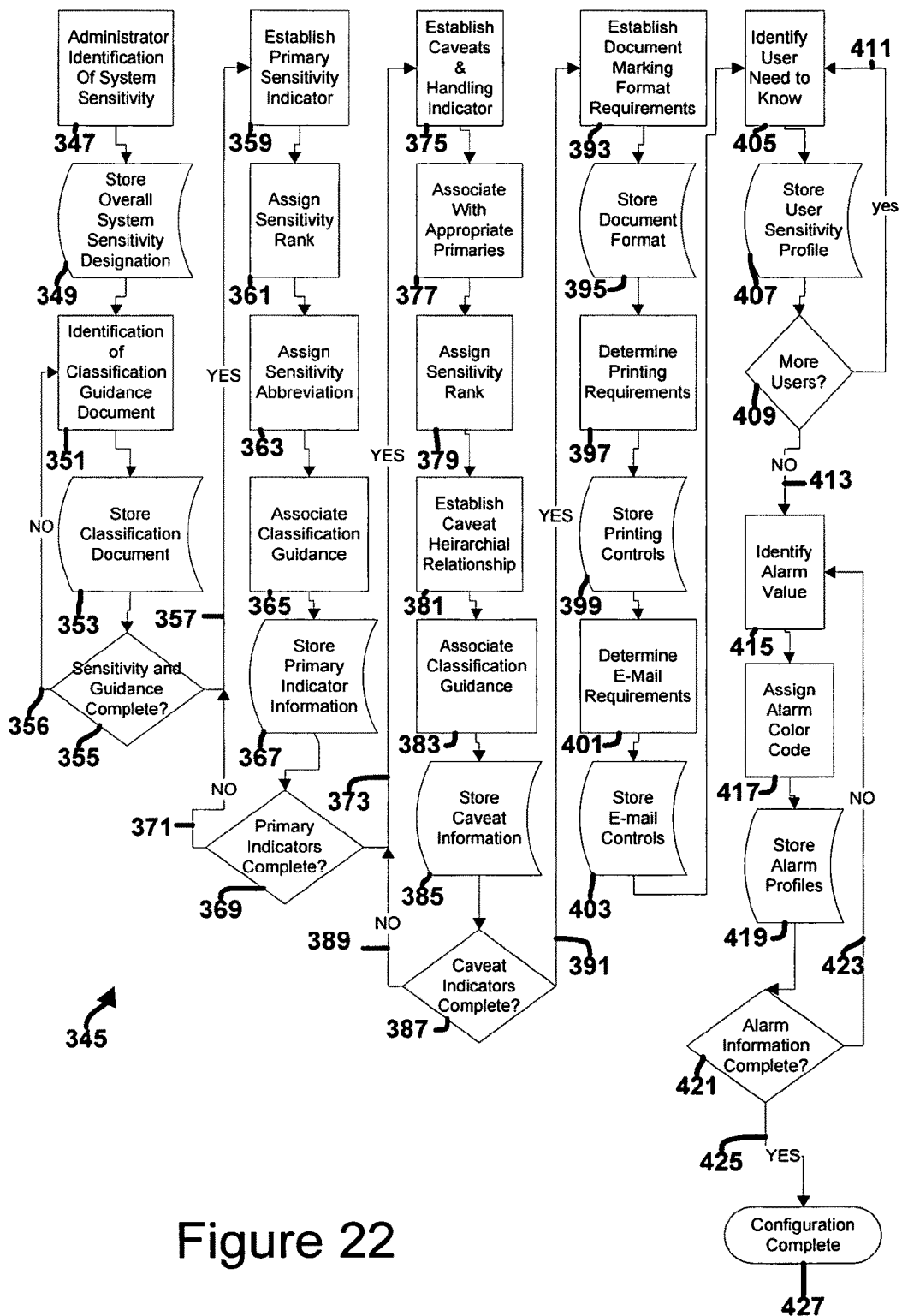
FIG. 22 is a process flowchart for invention system configuration of marking and control criteria.

FIG. 22 is a process flowchart 345 for configuration of system marking and control criteria. Initially, an administrator identifies system sensitivity 347. Overall system sensitivity designations are then stored 349. Classification guidance documents are then identified 351 and stored 353. A determination is then made as to whether sensitivity and guidance document identification is complete 355. If not 356 another sensitivity or guidance document is identified and stored until complete 355.

If all sensitivity and guidance documents have been identified and registered 357, a primary sensitivity indicator is established 359. Sensitivity rank is assigned to the primary indicator 361. A sensitivity abbreviation is assigned to the primary indicator 363. Classification guidance is associated to the primary indicator 365. Primary indicator information is stored 367. A determination is then made as to whether primary indicators are complete 369. If primary indicators are not complete 371, another primary sensitivity indicator is again established 359.

If the primary indicators are complete 373, caveats and handling indicators are established 375. The caveats and handling indicators are associated with appropriate primary indicators 377. Sensitivity rank and weight are assigned to the caveats, sub caveats and handling indicators 379. A caveat and handling indicator hierarchal relationship and precedence are established 381. Classification guidance is associated to the caveats and handling indicators 383 and caveat or handling information is stored 385. A determination is then made as to whether all caveat and handling indicators have been identified and are complete 387. If caveat indicators are not complete 389, another caveat and handling indicator is again established 375.

If caveat indicators are complete 391, document marking format requirements are established 393. Document format is stored 395 and printing requirements are determined 397 and stored 399. E-mail requirements are determined 401 and stored 403.

User "Need to Know" is then identified 405. A user sensitivity profile is then stored 407. A determination is then made as to whether more user exist 409. If there are more users 411, then user "Need to Know" is identified 405 for each additional user. If no more users exist 413, an alarm value is identified 415. An alarm color code is assigned 417 and alarm profiles are stored 419. A determination is made as to whether the alarm information is complete 421. If the alarm information is not complete 423, another alarm value is again identified 415. If the alarm information is complete 425, then the configuration is complete 427.

While the invention has been described with reference to specific embodiments, modifications and variations of the invention may be constructed without departing from the scope of the invention.

We claim:

1. A computer implemented method to automate an overall document classification mark determination for information of an electronic document in accordance with an information security classification process, said method comprising:
   a. executing on at least one computer system,
   b. establishing an electronic document security regimen comprising of at least one criterion of an information security classification process,
   c. establishing a hierarchal algorithm associated with said at least one criterion of said electronic document security regimen,
   d. establishing an overall document mark for information of an electronic document from said hierarchal algorithm, where said hierarchal algorithm uses at least one classification mark existing for at least one informational portion of said electronic document, and e. inserting said overall document mark into said electronic document.

2. The method of claim 1, wherein said electronic document security regimen further comprising at least one requirement for a final classification mark and wherein said overall document mark is established as said final classification mark where said at least one requirement is met, and wherein said overall document mark is established as an interim mark where said at least one requirement is not met.

3. The method of claim 1, wherein said electronic document security regimen further comprising at least one requirement for an interim mark and wherein said overall document mark is established as said interim mark when said at least one requirement is met.

4. The method of claim 1, further comprising:
a. identifying a change to said electronic document,
b. re-establishing said overall document mark for said electronic document, and
c. re-inserting said overall document mark in said electronic document.

5. The method of claim 1, further comprising:
a. establishing a document identification string comprising said overall document mark, and
b. inserting said document identification string into a visible display space of a document development application for said electronic document.

6. The method of claim 1, further comprising establishing said overall document mark before said electronic document is transferred.

7. The method of claim 6, wherein said electronic document is transferred comprising at least one of: sending said electronic document as email, or printing said electronic document.

8. The method of claim 1, further comprising establishing said overall document mark before said electronic document is saved to an electronic storage medium.

9. The method of claim 8, wherein said electronic document is saved before an output action of a document development application is performed on said electronic document.

10. The method of claim 9, wherein said output action comprising at least one of printing, or displaying a slide show.

11. The method of claim 1, wherein said inserting said overall document mark into said electronic document, said overall document mark is embedded into an electronic shell of said electronic document.

12. A computer-implemented method to assist an information security classification process of an organization for security classification and marking of an electronic document on a computer system, said method comprising:
a. performing on at least one computer system,
b. establishing an electronic document security regimen comprising at least one criterion of an information security classification process,
c. displaying a user classification dialogue for at least one informational portion of an electronic document, where said user classification dialogue comprising a menu of choices, where said menu of choices comprising at least one element for selection, and where said at least one element is associated with said at least one criterion of said electronic document security regimen,
d. retrieving said at least one element where said at least one element is selected,
e. establishing a classification mark from said at least one criterion associated with the retrieved said at least one element, and
f. inserting said classification mark into said electronic document.

13. The method of claim 12, further comprising providing an administrative interface for establishing said at least one criterion of said electronic document security regimen.

14. The method of claim 12, further comprising:
a. establishing a unique code for said electronic document security regimen for an organization, and
b. embedding said unique code into said electronic document,
whereby said unique code establishes for said electronic document an identification of ownership for said organization.

15. The method of claim 12, further comprising inserting a location storage path for said electronic document into said electronic document.

16. The method of claim 15, wherein said location storage path comprising of a unique identification code assigned to a storage medium on said computer system.

17. The method of claim 12, further comprising associating a second electronic document that is derived from a first electronic document, wherein said associating said second electronic document that is derived from said first electronic document comprising:
a. generating a unique code,
b. embedding said unique code into said second electronic document, and
c. embedding said unique code into said first electronic document.

18. The method of claim 12, wherein said inserting said classification mark into said electronic document, said classification mark identifies said at least one informational portion as national security classified information, sensitive information, or unclassified information.

19. The method of claim 12, further comprising establishing said classification mark before said electronic document is saved to an electronic storage medium.

20. The method of claim 12, further comprising:
establishing a hierarchal algorithm associated with said at least one criterion of said electronic document security regimen, establishing an overall document mark for said electronic document from said hierarchal algorithm, where said hierarchal algorithm uses said classification mark existing for said at least one informational portion of said electronic document and inserting said overall document mark into said electronic document.

21. The method of claim 20, wherein said establishing said overall document mark, where said overall document mark is established before said electronic document is transferred.

22. The method of claim 21, wherein said electronic document is transferred comprising: sending said electronic document as email, or printing said electronic document.

23. The method of claim 20, wherein said electronic document security regimen further comprising at least one requirement for a final classification mark and wherein said overall document mark is established as said final classification mark where said at least one requirement is met, and where said overall document mark is established as an interim mark where said at least one requirement is not met.

24. The method of claim 23, wherein said at least one requirement comprising said electronic document does not have an unresolved tracked change to information of said electronic document.

25. The method of claim 23, wherein said at least one requirement comprising a classification block exists within said electronic document.

26. The method of claim 23, wherein said at least one requirement comprising all informational portions of said electronic document have a portion mark or a code indicating said portion mark is not required.

27. The method of claim 20, further comprising:
a. establishing a document identification string that incorporates said overall document mark, and
b. inserting said document identification string into a visible display space of a document development application for said electronic document.

28. The method of claim 20, wherein said electronic document security regimen further comprising at least one requirement for an interim classification mark, and wherein said overall document mark is established as said interim classification mark where said at least one requirement is met.

29. The method of claim 28, wherein said at least one requirement comprising said at least one informational portion without a portion mark and without a code, where said code indicates said portion mark is not required for said at least one informational portion.

30. The method of claim 20, further comprising:
a. identifying a change to said electronic document,
b. re-establishing said overall document mark for said electronic document, and
c. re-inserting said overall document mark in said electronic document.

31. The method of claim 20, further comprising establishing said overall document mark before said electronic document is saved to an electronic storage medium.

32. The method of claim 31, wherein said electronic document is saved before an output action of said computer system is performed for said electronic document.

33. The method of claim 32, wherein said output action comprising at least one of: printing, or displaying a presentation.

34. The method of claim 20, wherein said inserting said overall document mark into said electronic document, said overall document mark is embedded into an electronic shell of said electronic document.

35. The method of claim 12, wherein said electronic document security regimen further comprising at least one unique code that is associated with said at least one criterion, and wherein said method further comprising embedding said at least one unique code into said electronic document where said at least one unique code is associated with said classification mark.

36. The method of claim 12, wherein said at least one criterion comprising at least one designator, where said at least one designator comprising at least one of:
a. a national security classification,
b. a sensitive classification, or
c. an unclassified classification.

37. The method of claim 12, wherein said at least one informational portion in said electronic document is a single said at least one informational portion, and wherein said classification mark is established as a portion mark.

38. The method of claim 12, wherein said at least one informational portion of said electronic document is more than one said at least one informational portion of said electronic document, and wherein said classification mark is established as an overall document mark.

39. The method of claim 12, wherein said at least one element is pre-selected to represent a pre-existing said classification mark.

40. The method of claim 12, wherein said electronic document security regimen further comprising a need-to-know access profile assigned to a user of said computer system, and wherein said at least one element, of said menu of choices, is limited to said need-to-know access profile assigned to said user of said computer system.

41. The method of claim 12, wherein said electronic document security regimen further comprising at least one classification guidance document registered in said electronic document security regimen, and wherein said method further comprising displaying said classification guidance document to a user of said computer system.

42. The method of claim 12, further comprising setting focus to said at least one informational portion of said electronic document within a document development application.

43. The method of claim 12, further comprising highlighting said at least one informational portion of said electronic document within a document development application.

44. The method of claim 12, wherein said at least one criterion comprising of at least one high-level classification designator, and wherein said at least one element comprising of at least one high-level element.

45. The method of claim 44, wherein said at least one criterion further comprising of at least one caveat, and wherein said at least one element further comprising of at least one caveat element.

46. The method of claim 45, wherein said at least one caveat element is associated with said at least one high-level element.

47. The method of claim 45, wherein said at least one caveat element is associated with a second said at least one caveat element.

48. The method of claim 12, further comprising:
a. providing a central service server comprising a relational structure,
b. assigning a unique identification code to at least one element of said at least one computer system, and
c. registering said at least one element of said at least one computer system with the assigned said unique identification code in said relational structure.

49. The method of claim 48, wherein said at least one element of said at least one computer system comprising at least one of:
a. a user of said at least one computer system,
b. said electronic document, or
c. an electronic storage medium.

50. The method of claim 48, further comprising:
a. assigning a unique identification code to said at least one computer system,
b. assigning a unique identification code to a network of said at least one computer system,
c. registering said at least one computer system with the assigned said unique identification code in said relational structure, and
d. registering said network with the assigned said unique identification code in said relational structure.

51. The method of claim 12, further comprising:
a. providing a central service server comprising a relational structure, and
b. registering a storage location and an overall document mark for said electronic document in said relational structure.

52. The method of claim 51 wherein said storage location comprising:
a. a computer identification,
b. a drive identification, and
c. a file path on said drive for said electronic document.

53. The method of claim 12, wherein said menu of choices further comprising a mark not required selection, and wherein said method further comprising retrieving said mark not required selection where said mark not required selection is selected, whereby said mark not required selection establishes that no visible said classification mark is required for said at least one informational portion.

54. The method of claim 53, wherein the retrieved said mark not required selection is represented by a code, and wherein said method further comprising inserting said code into said electronic document.

55. The method of claim 12, wherein said inserting said classification mark into said electronic document, said classification mark is embedded into an electronic shell of said electronic document.

56. The method of claim 12, wherein said inserting said classification mark into said electronic document, said classification mark is embedded into said at least one informational portion of said electronic document.

57. The method of claim 12, wherein said inserting said classification mark into said electronic document, where said classification mark is inserted as being associated with said at least one informational portion of said electronic document.

58. The method of claim 12, wherein said at least one computer system comprising at least two computer systems communicating over a network.

59. The method of claim 12, wherein said menu of choices further comprising an unknown selection, and wherein said method further comprising retrieving said unknown selection where said unknown selection is selected, whereby said unknown selection establishes that a classification for said at least one informational portion is not known and will need further consideration at a later time.

60. The method of claim 59, wherein the retrieved said unknown selection is represented by a code, and wherein said method further comprising inserting said code into said electronic document.

61. The method of claim 12, further comprising running in a compatible mode with a document development application on said computer system.

62. The method of claim 12, further comprising establishing a button within a document development application to initiate a classification marking process for said at least one informational portion.

63. The method of claim 12, further comprising embedding at least one item of information into an electronic shell of said electronic document, where said at least one item of information comprising:
   a. a classification criterion for said electronic document, and
   b. a network identification for a network of said at least one computer system where said electronic document is developed.

64. A system to automate an overall document classification mark determination, for information of an electronic document in accordance with an information security classification process, said system comprising at least one computer system, where said at least one computer system comprising at least one computer readable electronic storage medium, where said at least one computer readable electronic storage medium comprising at least one software engine, where said at least one software engine comprising:
   a. establish an electronic document security regimen comprising of at least one criterion of an information security classification and marking process on said computer system,
   b. establish a hierarchal algorithm associated with said at least one criterion of said electronic document security regimen,
   c. establish an overall document mark for security classification of information of an electronic document from said hierarchal algorithm, where said hierarchal algorithm uses at least one classification mark existing for at least one informational portion of said electronic document, and
   d. insert said overall document mark into said electronic document.

65. A system to assist an information security classification process of an organization for security classification and marking of an electronic document, said system comprising at least one computer system, where said at least one computer system comprising at least one electronic storage medium, where said at least one electronic storage medium comprising at least one software engine, where said at least one software engine comprising:
   a. establish an electronic document security regimen comprising at least one criterion of an information security classification process,
   b. display a user classification dialogue for at least one informational portion of an electronic document, where said user classification dialogue comprising a menu of choices, where said menu of choices comprising at least one element for selection, and where said at least one element is associated with said at least one criterion of said electronic document security regimen,
   c. retrieve said at least one element, where said at least one element is selected,
   d. establish a classification mark from said at least one criterion associated with the retrieved said at least one element, and
   e. insert said classification mark into said electronic document.

66. The system of claim 65, wherein said at least one software engine further comprising provide an administrative interface to establish said at least one criterion of said electronic document security regimen.

67. The system of claim 65, wherein said at least one software engine further comprising:
   a. establish a unique code for said electronic document security regimen for an organization, and
   b. embed said unique code into said electronic document, whereby said unique code establishes for said electronic document an identification of ownership for said organization.

68. The system of claim 65, wherein said at least one software engine further comprising insert a location storage path for said electronic document into said electronic document.

69. The system of claim 65, wherein said at least one software engine further comprising associate a second electronic document that is derived from a first electronic document, wherein said associate said second electronic document that is derived from said first electronic document comprising:
   a. generate a unique code,
   b. embed said unique code into said second electronic document, and
   c. embed said unique code into said first electronic document.

70. The system of claim 65, wherein said insert said classification mark into said electronic document, said classification mark identifies said at least one informational portion as national security classified information, sensitive information, or unclassified information.

71. The system of claim 65, wherein said at least one software engine further comprising establish said classification mark before said electronic document is saved to said at least one electronic storage medium.

72. The system of claim 65, wherein said at least one software engine further comprising: establish a hierarchal algorithm associated with said at least one criterion of said electronic document security regimen, establish an overall document mark for said electronic document from said hierarchal algorithm, where said hierarchal algorithm uses said classification mark existing for said at least one portion of said electronic document, and insert said overall document mark into said electronic document.

73. The system of claim 72, wherein said electronic document security regimen further comprising at least one requirement for a final classification mark and wherein said overall document mark is established as said final classification mark where said at least one requirement is met, and where said overall document mark is established as an interim mark where said at least one requirement is not met.

74. The system of claim 73, wherein said at least one requirement comprising all informational portions of said electronic document have a portion mark or a code indicating said portion mark is not required for said at least one informational portion.

75. The system of claim 72, wherein said at least one software engine further comprising:
 a. establish a document identification string that incorporates said overall document mark, and
 b. insert said document identification string into a visible display space of a document development application for said electronic document.

76. The system of claim 72, wherein said electronic document security regimen further comprising at least one requirement for an interim classification mark, and wherein said overall document mark is established as said interim classification mark where said at least one requirement is met.

77. The system of claim 76, wherein said at least one requirement comprising said at least one informational portion without a portion mark and without a code, where said code indicates said portion mark is not required for said at least one informational portion.

78. The system of claim 72, wherein said at least one software engine further comprising:
 a. identify a change to said electronic document,
 b. re-establish said overall document mark for said electronic document, and
 c. re-insert said overall document mark in said electronic document.

79. The system of claim 72, wherein said at least one software engine further comprising establish said overall document mark before said electronic document is saved to an electronic storage medium.

80. The system of claim 65, wherein said electronic document security regimen further comprising at least one unique code that is associated with said at least one criterion, and wherein said at least one software engine further comprising embed said at least one unique code into said electronic document, where said at least one unique code is associated with said classification mark.

81. The system of claim 65, wherein said at least one criterion comprising at least one designator, where said at least one designator comprising at least one of:
 a. a national security classification,
 b. a sensitive classification, or
 c. an unclassified classification.

82. The system of claim 65, wherein said at least one informational portion in said electronic document is a single said at least one informational portion, and wherein said classification mark is established as a portion mark.

83. The system of claim 65, wherein said at least one informational portion of said electronic document is more than one said at least one informational portion of said electronic document, and wherein said classification mark is established as an overall document mark.

84. The system of claim 65, wherein said at least one element is pre-selected to represent a pre-existing said classification mark.

85. The system of claim 65, wherein said electronic document security regimen further comprising a need-to-know access profile assigned to a user of said computer system, and where said at least one element, of said menu of choices, is limited to said need-to-know access profile assigned to said user of said computer.

86. The system of claim 65, wherein said electronic document security regimen further comprising at least one classification guidance document registered in said electronic document security regimen, and wherein said at least one software engine further comprising display said classification guidance document to a user of said computer system.

87. The system of claim 65, wherein said at least one software engine further comprising set focus to said at least one informational portion of said electronic document within a document development application.

88. The system of claim 65, wherein said at least one software engine further comprising highlight said at least one informational portion of said electronic document within a document development application.

89. The system of claim 65, wherein said at least one criterion comprising of at least one high-level classification designator, and wherein said at least one element comprising of at least one high-level element.

90. The system of claim 89, wherein said at least one criterion further comprising of at least one caveat, and wherein said at least one element further comprising of at least one caveat element.

91. The system of claim 90, wherein said at least one caveat element is associated with said at least one high-level element.

92. The system of claim 90, wherein said at least one caveat element is associated with a second said at least one caveat element.

93. The system of claim 65, wherein said at least one software engine further comprising:
 a. provide a central service server comprising a relational structure,
 b. assign a unique identification code to at least one element of said at least one computer system, and
 c. register said at least one element of said at least one computer system with the assigned said unique identification code in said relational structure.

94. The system of claim 93, wherein said at least one software engine further comprising:
 a. assign a unique identification code to said at least one computer system,
 b. assign a unique identification code to a network of said at least one computer system,
 c. register said at least one computer system with the assigned said unique identification code in said relational structure, and
 d. register said network with the assigned said unique identification code in said relational structure.

95. The system of claim 65, wherein said at least one software engine further comprising:
  a. provide a central service server comprising a relational structure, and
  b. register a storage location and an overall document mark for said electronic document in said relational structure.

96. The system of claim 65, wherein said menu of choices further comprising a mark not required selection, and wherein said at least one software engine further comprising retrieving said mark not required selection where said mark not required selection is selected, whereby said mark not required selection establishes that no visible said classification mark is required for said at least one informational portion.

97. The system of claim 96, wherein the retrieved said mark not required selection is represented by a code, and wherein said at least one software engine further comprising inserting said code into said electronic document.

98. The system of claim 65, wherein said insert said classification mark into said electronic document, said classification mark is associated with said at least one informational portion of said electronic document.

99. The system of claim 65, wherein said at least one computer system comprising at least two computer systems communicating over a network.

100. The system of claim 65, wherein said menu of choices further comprising an unknown selection, and wherein said at least one software engine further comprising retrieving said unknown selection where said unknown selection is selected, whereby said unknown selection establishes that a classification for said at least one informational portion is not known and will need further consideration at a later time.

101. The system of claim 100, wherein the retrieved said unknown selection is represented by a code, and wherein said at least one software engine further comprising inserting said code into said electronic document.

102. The system of claim 65, wherein said at least one software engine runs in a compatible mode with a document development application on said computer system.

103. The system of claim 65, wherein said at least one software engine further comprising establish a button within a document development application to initiate a classification marking process for said at least one informational portion.

104. The system of claim 65, wherein said at least one software engine further comprising embed at least one item of information in an electronic shell of said electronic document, where said at least one item of information comprising:
  a. a classification criterion for said electronic document, and
  b. a network identification for a network of said at least one computer system where said electronic document is developed.

105. A computer program product to assist an information security classification process of an organization for security classification and marking of an electronic document, where said computer program product comprising at least one computer readable electronic storage medium, where said at least one computer readable electronic storage medium comprising at least one software engine, where said at least one software engine comprising:
  a. establish an electronic document security regimen comprising at least one criterion of an information security classification process,
  b. display a user classification dialogue for at least one informational portion of an electronic document, where said user classification dialogue comprising a menu of choices, where said menu of choices comprising at least one element for selection, and where said at least one element is associated with said at least one criterion of said electronic document security regimen,
  c. retrieve said at least one element where said at least one element is selected,
  d. establish a classification mark from said at least one criterion associated with the retrieved said at least one element, and
  e. insert said classification mark into said electronic document.

106. A computer program product to automate an overall document classification mark determination, for information of an electronic document, in accordance with an information security classification process, the computer program product comprising at least one computer readable electronic storage medium, where said at least one computer readable electronic storage medium comprising at least one software engine, where said at least one software engine comprising:
  a. establish an electronic document security regimen comprising of at least one criterion of an information security classification process,
  b. establish a hierarchal algorithm associated with said at least one criterion of said electronic document security regimen,
  c. establish an overall document mark for information of an electronic document from said hierarchal algorithm, where said hierarchal algorithm uses at least one classification mark existing for at least one informational portion of said electronic document, and
  d. insert said overall document mark into said electronic document.

* * * * *